Nov. 19, 1968     J. A. ROLL ET AL     3,411,591

COIL POWER SPRING IMPACT MECHANISM

Filed March 3, 1966     28 Sheets-Sheet 1

Jack A. Roll
Charles H. Samson, Jr.
Lee L. Lowery, Jr.
James C. Anderson
      INVENTORS BY *James F. Weiler*
*Jefferson D. Giller*
*William L. Stout*
*Paul L. DeVerter II*
*Dudley R. Dobie, Jr.*
      ATTORNEYS

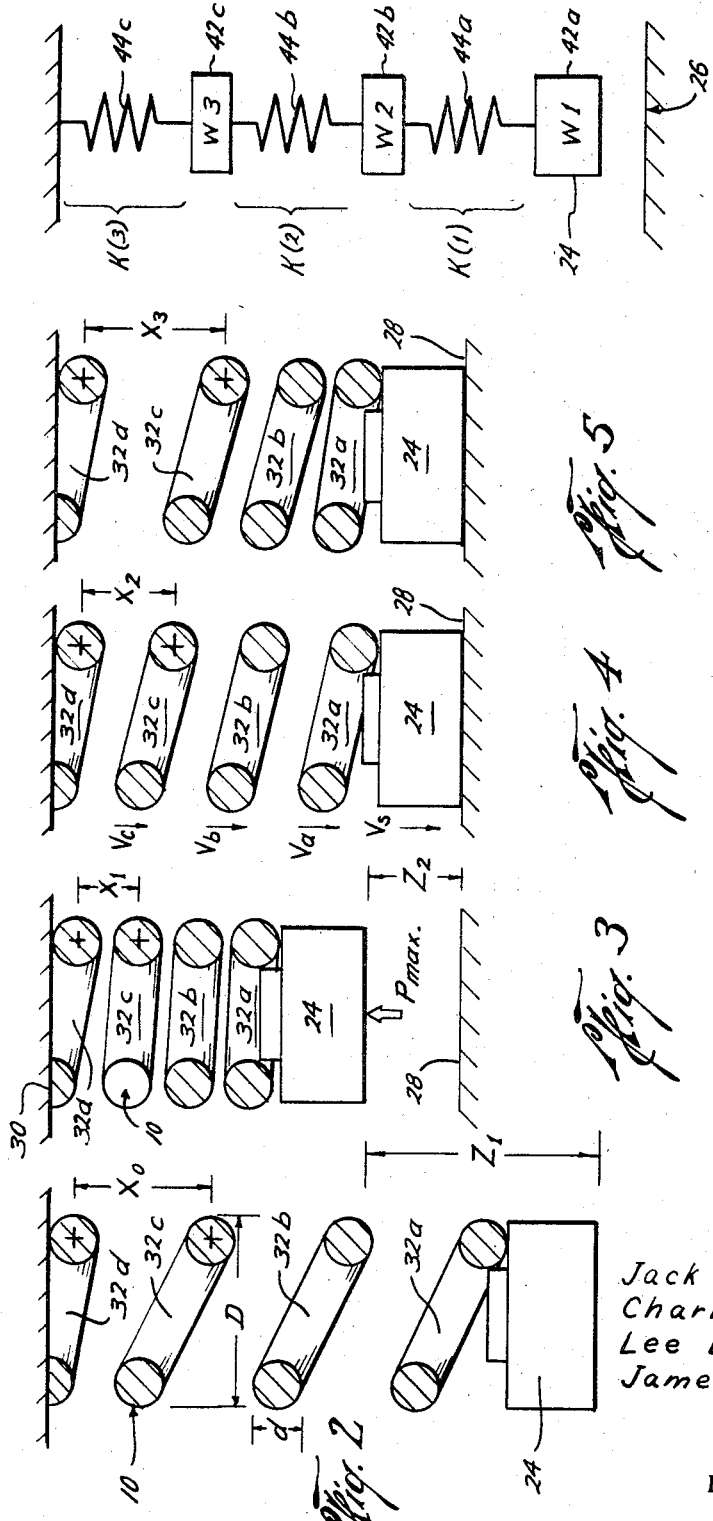

Jack A. Roll
Charles H. Samson, Jr.
Lee L. Lowery, Jr.
James C. Anderson
INVENTORS Jack A. Roll
Charles H. Samson, Jr.
Lee L. Lowery, Jr.
James C. Anderson
INVENTORS

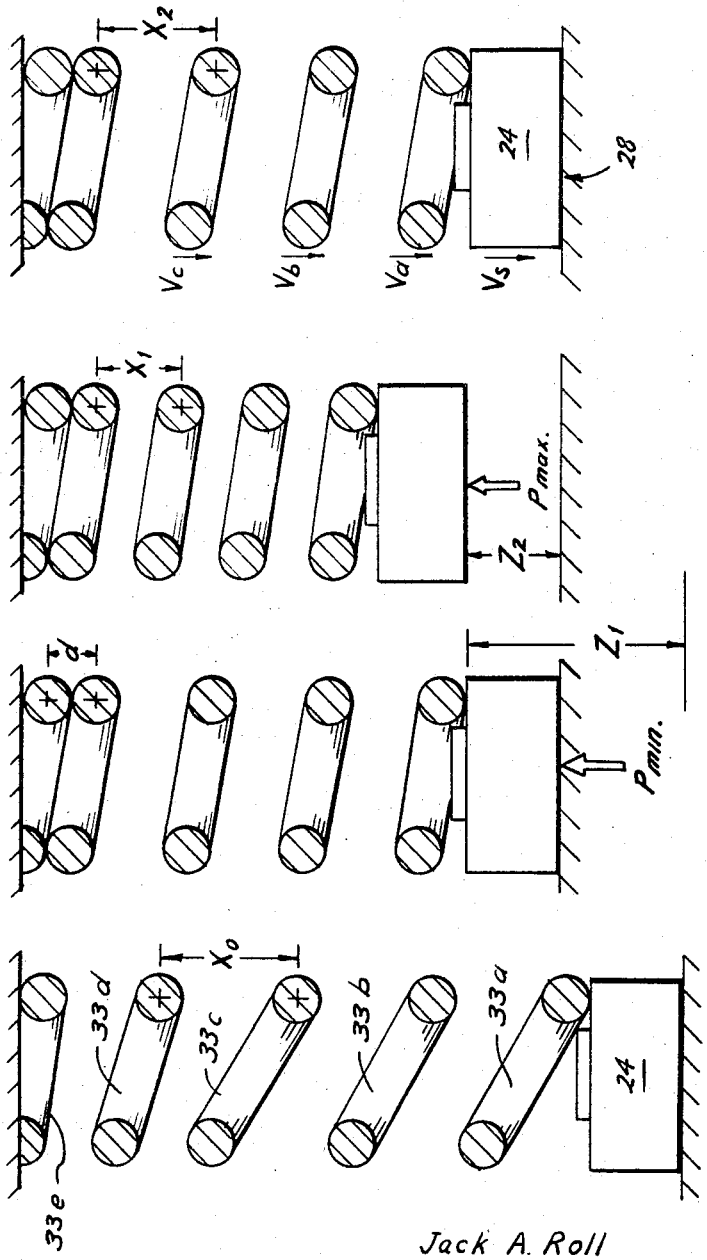

Nov. 19, 1968
J. A. ROLL ET AL
3,411,591
COIL POWER SPRING IMPACT MECHANISM
Filed March 3, 1966
28 Sheets-Sheet 6
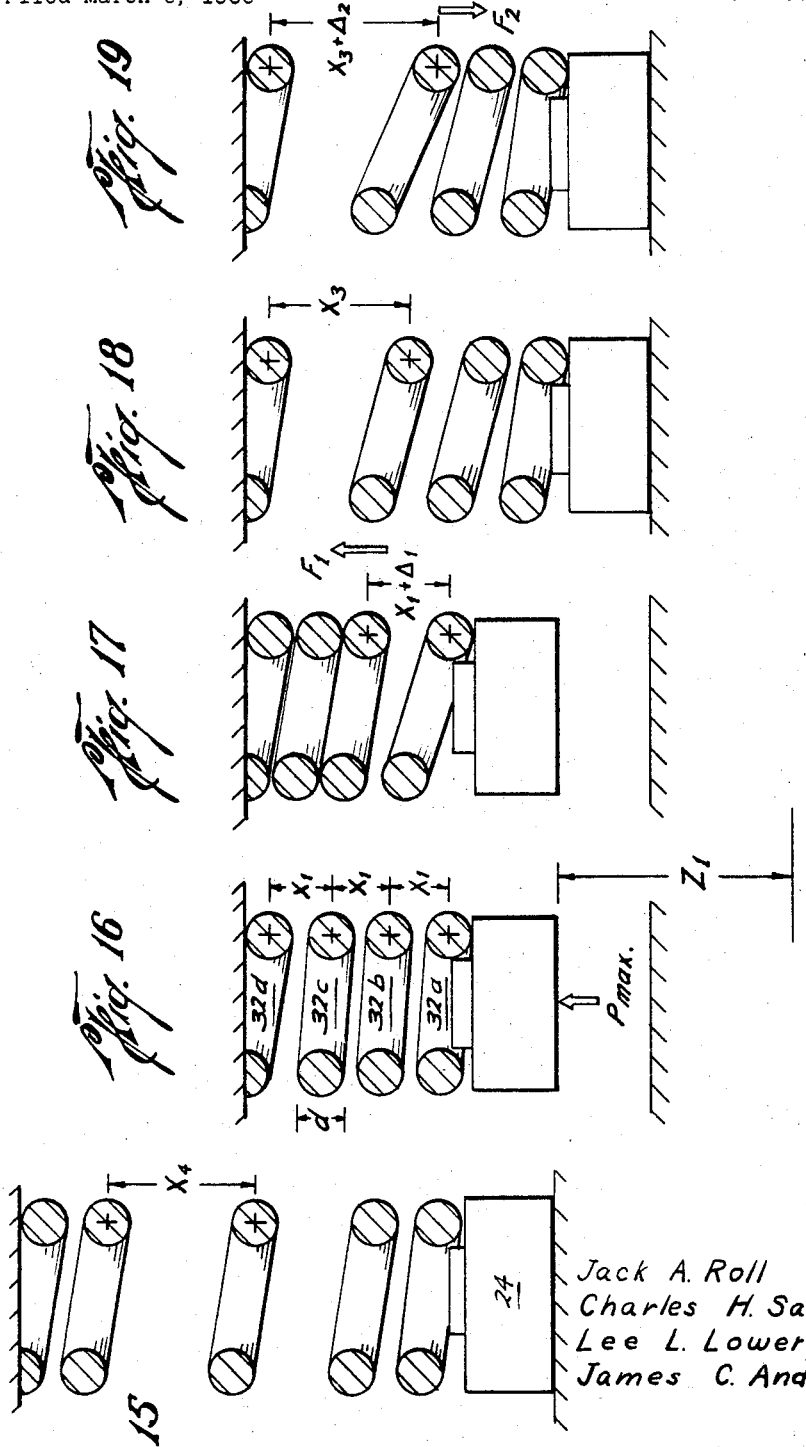
Jack A. Roll
Charles H. Samson, Jr.
Lee L. Lowery, Jr.
James C. Anderson
INVENTORS
BY
ATTORNEYS Jack A. Roll
Charles H. Samson, Jr.
Lee L. Lowery, Jr.
James C. Anderson
INVENTORS Jack A. Roll
Charles H. Samson, Jr.
Lee L. Lowery, Jr.
James C. Anderson
INVENTORS Jack A. Roll
Charles H. Samson, Jr.
Lee L. Lowery, Jr.
James C. Anderson
INVENTORS Jack A. Roll
Charles H. Samson, Jr.
Lee L. Lowery, Jr.
James C. Anderson
INVENTORS BY [signatures]

ATTORNEYS

Jack A. Roll
Charles H. Samson, Jr.
Lee L. Lowery, Jr.
James C. Anderson
INVENTORS Jack A. Roll
Charles H. Samson, Jr.
Lee L. Lowery, Jr.
James C. Anderson
INVENTORS Jack A. Roll
Charles H. Samson, Jr.
Lee L. Lowery, Jr.
James C. Anderson
INVENTORS Jack A. Roll
Charles H. Samson, Jr.
Lee L. Lowery, Jr.
James C. Anderson
INVENTORS Jack A. Roll
Charles H. Samson, Jr.
Lee L. Lowery, Jr.
James C. Anderson
INVENTORS

ATTORNEYS

Jack A. Roll
Charles H. Samson, Jr.
Lee L. Lowery, Jr.
James C. Anderson
INVENTORS Jack A. Roll
Charles H. Samson, Jr.
Lee L. Lowery, Jr.
James C. Anderson
INVENTORS

United States Patent Office 3,411,591
Patented Nov. 19, 1968

3,411,591
COIL POWER SPRING IMPACT MECHANISM
Jack A. Roll, Charles H. Samson, Jr., Lee L. Lowery, Jr., and James E. Anderson, Bryan, Tex., assignors, by mesne assignments, to Hughes Tool Company, Houston, Tex., a corporation of Delaware
Filed Mar. 3, 1966, Ser. No. 531,627
20 Claims. (Cl. 173—119)

ABSTRACT OF THE DISCLOSURE

A coil power spring and method of operation in which the parameters of the spring are selected to overcome both static and dynamic overloading. An improved coil power spring in which the dimensions of the spring are selected to avoid all modes of failure. An improved coil power spring utilizing dead or preloaded closed coils which are selected to avoid spring failure. An improved power spring which is sized to overcome harmonic stress by properly sizing the coil spacing at zero load. A coil power spring wherein the spring which is alternately compressed and released to provide a power impact of at least 25 foot pounds in which the spring parameters are selected to overcome the loads to which the spring is subjected.

---

The present invention relates to a coil power spring and method of operation, and also relates to a coil power spring and its method of operation for use in an impact mechanism for providing high energy impacts and having an extended service life.

By way of example only, the coil power spring of the present invention and its method of operation will be described in connection with its use in an impact mechanism for the purposes of illustration only, but it is understood that the coil spring and its operation is capable of many other uses where it is desired to provide a coil spring having large energy requirements and a long service life without failing. In the past, impact mechanisms have been utilized wherein a coil spring is provided which is alternately compressed and released to deliver an impact blow. These impact mechanisms have been successful wherein the energy output has been low. However, similar impact mechanisms have not been successful in which the energy output was greater than 25-foot pounds because the power spring could not deliver a useful number of cycles without breaking. The prior art has taught and emphasized that such failures are caused either (1) by the application of forces causing stresses which exceed the maximum allowable stress of the material and/or the maximum allowable stress range of the material, or (2) by harmonic surge. Even though these springs were designed to avoid overstressing cause by overloading and harmonic surge, it was found that the power springs still continued to break after a short period of use. However, we have noted another cause of spring failure in a dynamically operated power spring having large energy output requirements which we have termed "inertia surge."

Summary

The present invention relates to a coil power spring and its method of operation in which the parameters of operation and dimensions of the spring are selected in such a way to avoid failures due to harmonic stresses, dynamic stresses and inertia surge. In addition, design graphs are provided whereby power springs can be accurately and conveniently designed depending upon their operating requirements.

Therefore, it is a general object of the present invention to provide an improved coil power spring in general, and in particular for use in an impact mechanism in which the failure due to inertia surge is overcome.

Generally, harmonic surge in power springs is conventionally avoided by a proper selection of the natural resonant frequency of the spring with respect to operating frequency. But because the dimensions of the springs must be limited to overcome inertia surge, this conventional method for avoiding harmonic surge cannot always be used. As a result, we have found that springs which are designed to overcome the problem of inertia surge may be subject to harmonic surge. This harmonic surge, if not controlled, may itself lead to spring failure since harmonic vibrations (1) may cause stresses exceeding the maximum allowable stress of the material and/or (2) may cause an excessive stress range.

Therefore, another object of the present invention is the provision of a coil power spring and method of operation which will limit harmonic surge, such that the additional stresses exceed neither the maximum allowable stress nor the maximum allowable stress range of the material. It should be emphasized that harmonic surge need not be eliminated in order to provide a satisfactory spring design. Rather, the additional stresses caused by harmonic surge must only be limited such that the total resulting stresses do not exceed the allowable stresses.

A still further object of the present invention is the provision of an improved coil power spring in general, and for use in an impact mechanism, in which the parameters of the spring are selected to overcome both static and dynamic overloading.

A still further object of the present invention is the provision of an improved coil power spring in general, and for use in an impact mechanism, in which the dimensions of the spring are selected in such a way as to avoid all modes of failure.

A still further object of the present invention is the provision of an improved coil power spring utilizing dead or preloaded closed coils in general and for use in an impact mechanism in which the dimensions of the spring are selected in such a way to avoid failure.

Yet a further object of the present invention is to provide a method of limiting harmonic oscillations in a coil power spring in which the ratio of natural resonant frequency to the operating frequency is insufficient to prevent harmonic oscillations. This is accomplished by spacing the coils such that at maximum compression of the spring the oscillating coils contact adjacent coils thereby dampening the harmonic oscillations.

A further object of the present invention is the provision of a coil power spring for use in a high-energy impact mechanism, in which the ratio of natural resonant frequency of the spring to its operating frequency is insufficient to prevent excessive harmonic oscillations, by spacing the coils of the spring such that a sufficient number of oscillating coils touch adjacent coils so as to dampen excessive harmonic oscillations.

Other and further objects, features, and advantages of the present invention will appear from the following description, taken in conjunction with the accompanying drawings, in which FIGURE 1 is an elevational view, partly in cross-section, showing the use of a coil power spring in one type of impact mechanism, FIGURE 2 is a schematic view of a coil power spring in an impact mechanism shown in its position of zero compression, FIGURE 3 is a schematic view of the spring of FIGURE 2 shown in its position of maximum static compression, at which time the maximum static stress in the spring occurs, FIGURE 4 is a schematic view of the spring of FIGURE 2 shown at the time of impact, wherein the striker and coils have high downward velocities, FIGURE 5 is a schematic view of the spring of FIGURE 2 shown in its extended position shortly after the time of impact illustrating the effect of inertia surge which causes the spring to break adjacent the top coil, FIGURE 6 is a schematic view illustrating an equivalent mechanical circuit of a coil power spring, FIGURE 7 shows a plot of the true dynamic stresses which occur in one particular high-energy output spring as found by using high-speed photography, and also a plot of the stresses as determined by methods hereinafter disclosed.

FIGURES 8, 9, and 10 are graphs illustrating the true stress range of various wire diameters relative to the number of coils for the various spring parameters listed on the graphs, FIGURE 11 is a schematic view of a coil power spring shown in its position of zero compression similar to that of FIGURE 2 but having an additional coil $33e$, FIGURE 12 is a schematic view of the spring of FIGURE 11 shown in its preloaded positoin, wherein coil $33d$ has just become preloaded closed, FIGURE 13 is a schematic view of the spring of FIGURE 11 shown in its position of maximum static compression, FIGURE 14 is a schematic view of the spring of FIGURE 11 shown at the instant of impact wherein the striker and coils have high downward velocities, FIGURE 15 is a schematic view of the spring of FIGURE 11 shown in its extended position shortly after the instant of impact illustrating the reduction in the effect of inertia surge due to the additional coil $33e$, FIGURE 16 is a schematic view of the spring of FIGURE 2 shown in its position of maximum static compression, FIGURE 17 is a schematic view of the spring of FIGURE 2 being subjected to harmonic surge, FIGURE 18 is a schematic view of the spring of FIGURE 2 being subjected to inertia surge only, FIGURE 19 is a schematic view of the spring of FIGURE 2 being subjected to both inertia and harmonic surge, FIGURE 20 is a graph illustrating design curves based on conventional prior art computations, FIGURE 21 is a typical graph illustrating the method of determining the parameters of a satisfactory high-energy power spring according to the present invention, FIGURES 22 through 41 are design graphs from which a satisfactory high-energy power spring parameters may be selected for given conditions. The use of these graphs and a discussion of the terms used will be presented later.

Referring to the drawings and particularly to FIGURE 1, the reference numeral 10 generally indicates a coil power spring as used in one type of impact mechanism. The impact mechanism may include a rotatable means such as a hydraulic motor 12 for rotating a driving shaft 14 and in turn rotating bearings 16 attached thereto which ride on and over the surfaces of a cam 18 having cam shoulders and a drop-off (not shown). Thus, as the hydraulic motor rotates the shaft 14, the bearings 16 ride upon the cam shoulders thereby compressing the power spring 10 and when they reach the drop-off, release the cam thereby allowing the power spring 10 to deliver an impact below. The power spring 10 may be secured at its upper end to a fixed support 30 and at its lower end to the cam 19. The striker 24, which includes the hammer 23, the cam 18 and any other dead weight attached to the lower end of the spring, is driven downwardly when the power spring 10 is released thereby providing the impact blow against a member such as a tool 28. The particular impact mechanism forms no part of the present invention since the power spring 10 may be used in various types of impact mechanisms and while no further description of the impact mechanism is believed necessary, the structure and operation of the impact mechanism shown in FIGURE 1 is more fully described in a patent issued June 1, 1965, to Jack A. Roll, Ser. No. 3,186,498, entitled Impact Tool.

Referring now to FIGURES 2, 3, 4, and 5, FIGURE 2 shows the spring 10 with no load applied, in which case the distance between coils $32c$ and $32d$ is equal to $X_0$. While a power spring with only three active coils is shown here for simplicity ($32d$ is a dead coil), the following analysis is applicable to springs having any number of coils.

FIGURE 3 shows the spring 10 at the point of maximum static compression with its upper end seated on its upper support 30 and with the spring 10 statically compressed a distance $Z_1$. The distance $X_1$ between coils $32c$ and $32d$ may be found from the equation:

$$X_1 = X_0 - (Z_1 K/K_c) \quad \text{Equation 1}$$

where $X_1$ is the static distance between coils $32C$ and $32d$, $X_0$ and $Z_1$ are as shown in FIGURE 3, K is the spring rate of the whole spring, and $K_c$ is the spring rate of the top active coil $32c$. Knowing $X_0$ and $X_1$, the maximum static shearing stress in the top active coil $32c$ can be found by conventional formulae. For round wire the equation is:

$$S_1 = \frac{(X_0 - X_1)GdC}{\pi D^2} \quad \text{Equation 2}$$

where $S_1$ is the maximum static torsional shearing stress, $X_0$ and $X_1$ are the coil spacings as shown in FIGURES 2 and 3 respectively, G is the torsional modulus of rigidity of the material, D is the mean diameter of the spring, d is the diameter of the wire, and C is a factor correcting for the curvature of the spring. This equation is conventionally used to insure that the maximum static shearing stress due to the deformation $(X_0 - X_1)$ does not exceed the maximum allowable shearing stress of the material, $S_{\max}$ allowable.

After the spring 10 is thus compressed, the striker 24, which includes the hammer, cam, and any other dead weight attached to the lower end of the spring, is released, allowing the energy stored in the spring to drive the striker 24 down, whereupon the striker travels downward the distance $Z_2$ shown in FIGURE 4, hitting the tool 28 to provide the impact blow.

FIGURE 4 shows the spring 10 after it has driven the striker downward through the working stroke $Z_2$, thereby imparting high downward velocities to the striker and coils. The distance $Z_1 - Z_2$ is the amount of "preload" set in the spring. The distance $X_2$ between coils $32c$ and $32d$ is found by the equation:

$$X_2 = X_0 - \frac{(Z_1 - Z_2)K}{K_c} \quad \text{Equation 3}$$

where $X_2$, $X_0$, $Z_1$, and $Z_2$ are shown in FIGURES 2 and 4 and both K and $K_c$ have been previously defined.

Since $X_0$ and $X_2$ are now known, the corresponding stress in the top active coil $32c$ is calculated from conventional formulae. For round wire the equation is:

$$S_2 = \frac{(X_0 - X_2)GdC}{\pi D_2} \quad \text{Equation 4}$$

where $S_2$ is the minimum static shearing stress, $X_0$ and $X_2$ are as shown in FIGURES 2 and 4.

According to conventional procedures the dimensions of the power spring must now be specified such that the stress range $(S_1 - S_2)$ given by Equations 2 and 4 does not exceed the allowable stress range of the material, $S_R$ allowable. For round wire this restriction is given by:

$$\frac{(X_2 - X_1)GdC}{\pi D^2} \leq S_R \text{ allowable} \quad \text{Equation 5}$$

However, a power spring having dimensions based on Equation 5 will still fail even though the maximum static stress $S_1$ (from Equation 2), falls within the maximum allowable stress and even though harmonic surge is avoided. As will now be shown, these failures are the result of a dynamic stress range which greatly exceeds the stress range given by Equation 5.

Referring again to FIGURE 4, we note that the power spring 10 has imparted a velocity $V_s$ to the striker 24 in order to provide the desired impact blow against member 28, which in turn stops the striker. However, at this time the coils 32a, 32b, and 32c also have attained high velocities $Va$, $Vb$, and $Vc$, respectively, and their downward inertia causes them to "pile up," as illustrated in FIGURE 5, on the back of the striker 24. We have termed this effect "inertia surge."

As illustrated in FIGURE 5, this inertia surge further compresses the lower coils, thereby causing the top coil 32c to open further to a distance $X_3$. Therefore, the stress range imposed on the upper coil 32c is actually much greater than that given by conventional analysis, and rapid failure will occur unless the dimensions of the power spring are specified such that $$\frac{(X_3-X_1)GdC}{\pi D^2} \leq S_R \text{ allowable} \quad \text{Equation 6}$$

where $X_3$ is the maximum dynamic spacing of the top coil 32c caused by inertia surge, as illustrated in FIGURE 5, and the other quantities have been previously defined. Therefore, the conventional Equation 5 is incorrect for dynamic operation of this kind and Equation 6 must be employed to account for inertia surge, and to prevent rapid failure of the power spring. Of course, for springs in general Equation 6 would be $$(X_3-X_1)V \leq S_R \text{ allowable} \quad \text{Equation 6a}$$

where V is a factor converting deflection to stress.

We have, therefore, determined that inertia surge causes a very high stress range in the upper coil 32c, which also explains why the power spring usually fails adjacent to this coil. Because of the high stress range caused by inertia surge, previous attempts have failed to establish the correct dimensions and operating conditions required for a satisfactory high-energy output spring.

Offhand, it would appear that since the failure is due to overstressing, the wire size of the spring 10 could simply be increased to eliminate this overstressing. In fact, this is actually what conventional design methods suggest. However, we have found that such an increase in the wire diameter increases the mass of the coils 32a, 32b, and 32c thereby increasing the effect of inertia surge in the spring, resulting in a further increase in the actual stress range, which again causes rapid failure of the spring. Therefore in spite of the fact that a power spring may be conventionally designed for severe service and have a maximum shearing stress $S_1$ and a maximum static stress range $(S_1-S_2)$ within the allowables for the spring material, the actual stress range will exceed the allowable because of the inertia surge thereby causing premature failure of the power spring.

Referring again to FIGURE 5 and to Equation 6, it should be noted that the overstressing in coil 32c is caused by its increased deflection, that is, the dynamic stresses in the coils 32a, 32b, and 32c are directly related to their physical deflections. Conversely, these dynamic deflections are directly related to the stresses in the coils. Therefore, a method of calculating the dynamic deflections of the coils of the spring 10 will be presented, in order to determine the stresses actually occurring in the coils. This will allow a selection of dimensions for a spring that will be properly sized, which will not be overdeflected, and consequently will not be overstressed and will give the required service life.

As a mechanical idealization, a spring may be represented, as seen in FIGURE 6, by a series of concentrated masses 42a, 42b, 42c and by a series of weightless springs 44a, 44b, and 44c, the mass of the striker 24 being considered as the first concentrated mass 42a. The system illustrated in FIGURE 6 illustrates one possible mechanical equivalent of the coil power spring 10 of FIGURE 2, and was arrived at by dividing the power spring into three weightless springs and three concentrated masses. In this case each weightless spring has a spring rate corresponding to that of a single coil and the weights of the concentrated masses correspond to the weight of one coil except for 42a whose weight corresponds to that of the striker. Using this model, the displacements of the striker and coils, after the striker is released, can be computed at incremental units of time. By noting the displacements of the coils, the maximum and minimum coil deflections and therefore the maximum stress range can be computed, thereby determining whether or not the dimensions of the spring have been chosen such that the actual stresses do not exceed the allowables of the material.

As previously stated, since the physical deflections are directly related to the stresses in the coils, the stresses in the coils can be calculated to determine whether or not they exceed the allowable stresses of the material used for the spring. The correct stress equation has been found to be as follows:

Equation 7

$$S_R \text{ allowable} \geq F[P_{max} - K(m)\{Y_{(m,t)} - Y_{(m+1,t)}\}]$$

for all intervals of time, where

F is a factor converting force to stress in the spring.
$P_{max}$ is the maximum static compressive force applied to the spring.
$K_{(m)}$ is the spring rate of weightless spring $m$.
$Y_{(m,t)}$ is the deflection of segment $m$ at time interval $t$.
$Y_{(m+1,t)}$ is the deflection of segment $m+1$ at time interval $t$.

Therefore, for round wire spring the equation is as follows:

$$S_R \text{ allowable} \geq \frac{8DC}{\pi d^3}[P_{max.} - K_{(m)}\{Y_{(m, t)} - Y_{(m+1, t)}\}]$$

Equation 8

The deflection equation for use in Equation 8 is:

$$Y(m, t) = 2Y(m, t-1) - Y(m, t-2) +$$
$$\frac{g\Delta t^2}{W(m)}\{[K_{(m-1)}][Y_{(m-1, t-1)}] + [K_{(m)}][Y_{(m+1, t-1)} - Y_{(m, t-1)}]\}$$

Equation 9 where $g$ = the acceleration of gravity,
$\Delta t$ = interval of time, and
$W_{(m)}$ = weight of concentrated mass $m$ The value of $\Delta t^2$ for Equation 9 is:

$$\Delta t^2 = \frac{(m)W}{1600K(m)} \quad \text{Equation 10}$$

The calculations are begun at $t=0$, with the spring statically compressed an amount $Z_1$, by the force $P_{max}$, as illustrated in FIGURE 3.

A solution for the initial deflections $Y(m,0)$ for each concentrated mass is:

$$Y_{(m,0)} = Y_{(m+1, 0)} + \frac{Z_1 K}{K(m)}$$

(for $1 \leq m \leq M$)

and:

$$Y_{(m+1,0)} = 0.0 \quad \text{Equation 11}$$
(for $m = M+1$)

where $Y(m,0)$ are the starting values of $Y(m,t)$ to be first used in Equation 9, $Z_1$ is as shown in FIGURE 3, K is the spring rate of the whole spring, $K(m)$ is the spring rate of the $m$th spring segment, and M is the number of segments into which the power spring is divided.

Values of $Y(m,t)$ are also required for $t<0$ (i.e. before the striker is released) and must be initialized in accordance with:

$$Y_{(m,-2)} = Y_{(m,-1)} = Y_{(m,0)} \quad \text{Equation 12}$$
(for all $m$)

where $Y(m,0)$ are given by Equation 11.

After the initial displacements are found using Equations 11 and 12, the force $P_{max}$ beneath the striker is removed, thereby releasing the striker, allowing the energy stored in the spring to drive the striker and coils downward. The subsequent dynamic displacements of the striker and coils are then determined by the repeated use of Equation 9.

Since several "boundary conditions" are usually present, Equation 9 must be restricted accordingly. FIGURE 4 illustrates a typical boundary condition which requires that at the time of impact the tool 28 stops the downward motion of the striker, that is, the striker cannot fall a distance greater than $Z_2$. Mathematically this requires that even though Equation 9 may yield a value less than $(Z_1-Z_2)$, the striker displacement $Y(1,t)$ must at all times satisfy the condition:

$$Y_{(1,t)} \geq (Z_1 - Z_2) \quad \text{Equation 13}$$

Again referring to FIGURE 4, it is seen that the top coil 32$d$ cannot move upwards. Thus a second boundary condition arises which requires that:

$$Y_{(M+1,t)} \leq 0.0 \quad \text{Equation 14}$$

for all values of $t$.

Also, since there is no spring beneath the striker ($m=1$), the value of $K(0)$ for use in Equation 9 will be zero.

Any other boundary conditions must also be satisified, although the three above are by far the most common.

To summarize the procedure, the following outline is provided:

(1) Consider the power spring as being divided into a large number of segments M. Each segment is then replaced by an equivalent concentrated mass and a weightless spring. Sufficient accuracy for all practical problems will be obtained by dividing the spring into 50 segments.

(2) Solve for $Y(m,0)$ using Equation 11 to satisfy the initial conditions, and initialize other displacements according to Equation 12.

(3) Use Equation 10 to solve for $\Delta t^2$ required for use in Equation 9.

(4) Starting with $m=1$ and $t=0$, calculate the new location of each mass, $Y(m,t+1)$, using Equation 9.

(5) Satisfy the existing boundary conditions such as those given by Equations 13 and 14.

(6) Repeat steps 4 and 5 until the maximum dynamic displacements between the coils have been found. These are then substituted into Equation 8 to determine the true stress range $S_R$ which must be resisted by the spring.

To check the accuracy of the method described above, we have done extensive testing using high-speed photography to experimentally determine the true dynamic action of various springs. The experimental results were then compared with the results given by the mathematical solution. FIGURE 7 illustrates one typical comparison between the experimental and theoretical results obtained for a power spring having four fully active coils. The resulting accuracy for this case is typical and testifies to the validity of the method.

The results of various wire parameters at various operating conditions may be seen most easily from graphs. FIGURES 8, 9, and 10 show actual values for the ranges of stress versus the number of coils for various circular wire diameters. FIGURE 8 is for a steel power spring having a 3.5 inch mean diameter coil, an output of 90 foot pounds with a stroke of 0.750 inch, and a hammer element weighing 17.7 pounds. FIGURE 9 is similar to FIGURE 8 but the results given are for a 4.0 inch mean diameter coil. Merely assuming that for the material used (steel) the maximum stress, $S_{max}$, of the spring must not exceed 100,000 p.s.i. and that the stress range $S_R$ must not exceed 60,000 p.s.i., it is to be noted from FIGURE 8 that a power spring having a coil diameter of 3.5 inches and a wire diameter of 0.563 will fail since the maximum resulting stress exceeds the allowable stress of 100,000 p.s.i. Normally in this case the wire diameter would be increased to 0.688 inch so that the maximum stress would be reduced to within the allowable stress. However, in the case of a five coil spring the dynamic stress range exceeds the allowable and the spring will fail prematurely. However, a power spring having a wire diameter of 0.688 would be satisfactory so long as it has ten or more coils. From this graph the critical range of sizes that are necessary to provide an operable power spring having a coil diameter of 3.5 inches under the above given operating conditions is noted.

Referring now to FIGURE 9 it is seen that a coil power spring with the same operating conditions as given for FIGURE 8, but having different size coil diameter will have entirely different values for the actual stress range. It is generally noted that increasing the wire diameter increases the stress range for a given spring, a result in direct oppoistion to conventional design.

Referring now to FIGURE 10, the stress characteristics of a power spring having the same energy output of 90 pounds as in FIGURES 8 and 9 is seen having a coil diameter of 3.5 inches, but having a stroke of only .500 inch is noted. From this chart it is noted that no spring having seven or fewer coils will have a satisfactory allowable stress range. That is, in order not to exceed the allowable stress range of the material, the wire diameter must be so small that the maximum allowable stress of 100,000 p.s.i. will be exceeded. Also, if the wire diameter is made large enough to withstand the maximum stress, the allowable stress range will be exceeded.

Since there are nine separate dimensional and operating parameters which affect the stresses of an impact spring, it becomes impractical to prepare design graphs to represent all useful impact springs which satisfy Equation 8. However, we have found that dimensionless design graphs having only four variables will provide the necessary dimensions for satisfactory high-energy power springs.

The following discussion concerning the methods application will, for convenience, be limited to springs having constant stiffness and weight distribution along their length. However, the method previously described can be used to establish the dimension of a satisfactory spring having a tapered wire, a variable mean diameter, non-linear load-deflection characteristics, etc.

Since the true stress range for a dynamically operated spring is greatly affected by its size, configuration, and various other factors, a selection of the required physical dimensions of the spring is facilitated by the use of dimensional analysis.

FIGURES 20 through 29 are dimensionless plots for springs having constant stiffness and weight distribution along their length, for example a spring having a constant pitch, a constant wire size, and a constant mean diameter. The spring wire may be circular, elliptical, square, or any other shape, since the results are shown in term of design forces rather than design stresses.

After a thorough study using dimensional analysis, we have found that there are 9 basic parameters which influence this particular problem, these parameters being:

K (the spring rate of the active coils of the spring).

$Wac$ (the total weight of the active coils of the spring),

M (the number of division into which the spring is divided),
Ws (the weight of the striker),
U (the energy output required),
$P_{max}$ (the maximum static force applied to the spring),
$P_R$ (the force range applied to the spring),
g (the acceleration of gravity), and
$\Delta t$ (the time interval).

Therefore, the following dimensionless ratios may be used to fully define the problem:

$(UK/Ws^2)$, $(P_{max}/Ws)$, $(P_R/Ws)$, $(Ws/Wac)$, $(M)$, and $(gKM^2\Delta t^2/Wac)$.

The dimensionless quantity M may be held constant by dividing all springs into the same number of division. Sufficient accuracy is obtained for all practical cases by considering the spring as being divided into 50 segments.

A second dimensionless ratio $(gKM^2\Delta t^2/Wac)$ may also be held constant by selecting $\Delta t^2$ in accordance with Equation 10. By letting $$\Delta t^2 = \frac{W(m)}{1600\, K(m)}$$

and since $K=K(m)/M$ and $Wac=MW(m)$, we find that:

$$\frac{gKM^2\Delta t^2}{Wac} = \frac{gK(m)M^2\Delta t^2}{W(m)M^2} = \frac{gK(m) \times W(m)}{W(m)1600K(m)} = \frac{g}{1600}$$

Thus, only the four remaining dimensionless ratios, $(UK/Ws^2)$, $(P_{max}/Ws)$, $(P_R/Ws)$, and $(Ws/Wac)$, are required to relate the actual forces imposed upon a spring to its physical properties and operating conditions.

FIGURE 20 shows a graph of the conventional design relationships upon which conventional spring dimensions are based. These are presented in order to emphasize the large design errors encountered prior to the conception and solution of inertia surge.

As seen in FIGURE 21 the value of $P_{max}/Ws$ greatly influences the relationship between $UK/Ws^2$ and $P_R/Ws$, and several curves for various $P_{max}/Ws$ are therefore required. However, we have found that these curves are mathematically related and that only a single curve or "base curve" need be plotted, from which any of the other curves can be determined.

The equations required to relate an unknown or "problem curve" to a known or "base curve" are:

$$\frac{(P_R/Ws)_{Prob}}{(P_R/Ws)_{Base}} = \frac{(P_{max}/Ws)_{Prob}}{(P_{max}/Ws)_{Base}}$$

Equation 15 and $$\frac{(UK/Ws^2)_{Prob}}{(UK/Ws^2)_{Base}} = \frac{(P_{max}/Ws)^2_{Prob}}{(P_{max}/Ws)^2_{Base}}$$

Equation 16

For example, assume that $P_R/Ws$ was required for a problem having $Ws/Wac=1$, $UK/Ws^2=40,000$ and $P_{max}/Ws=300$ but that only the base curve $P_{max}/Ws=1000$ had been plotted.

Therefore, the following quantities are known:
$(P_{max}/Ws)_{Prob}=300$, $(P_{max}/Ws)_{Base}=1000$, and $(UK/Ws^2)_{Prob}=40,000$ Now using Equation 16:

$$(UK/Ws^2)_{Base} = (UK/Ws^2)_{Prob}\frac{(P_{max}/Ws)^2_{Base}}{(P_{max}/Ws)^2_{Prob}}$$

$$(UK/Ws^2)_{Base} = (40,000)\frac{(1000)^2}{(300)^2} = 444,000$$

Thus entering FIGURE 21 at $(UK/Ws^2)=444,000$ and projecting to the base curve $(P_{max}/Ws=1000)$ we find the base value of $(P_R/Ws)_{Base}=1465$. This base value can now be converted to $(P_R/Ws)_{Prob}$ by use of Equation 15:

$$(P_R/Ws)_{Prob} = \frac{(P_R/Ws)_{Base}(P_{max}/Ws)_{Prob}}{(P_{max}/Ws)_{Base}}$$

$$(P_R/Ws)_{Prob} = (1465)\left(\frac{300}{1000}\right) = 439.5$$

To check the above method we can enter FIGURE 21 at the value $(UK/Ws^2)_{Prob}=40,000$ and project to the curve for $P_{max}/Ws=300$, from which we obtain $P_R/Ws=439.5$ directly.

Therefore, another reduction in the number of required curves is possible by using a single base curve and Equations 15 and 16. The base curves used will be those for which $P_{max}/Ws=1000$, so that Equations 15 and 16 become:

$$\frac{(P_R/Ws)_{Prob}}{(P_R/Ws)_{Base}} = \frac{(P_{max}/Ws)_{Prob}}{1000}$$

Equation 17 and $$\frac{(UK/Ws^2)_{Prob}}{(UK/Ws^2)_{Base}} = \frac{(P_{max}/Ws)^2_{Prob}}{(1000)^2}$$

Equation 18

The following example problem will demonstrate the practical application of FIGURES 22 thru 29. Assume that a power spring is to be designed for use in an impact mechanism and that a 5-active-coil spring with a mean diameter of 3.50 inches and 0.688 inch circular wire is to be used. The spring is to be made of a material having the following properties:

$G=11.5 \times 10^6$ p.s.i.
$\rho=0.283$ lb./in.$^3$
$S_{max\ allowable}=61,800$ p.s.i.
$S_{R\ allowable}=41,200$ p.s.i.

Further, the striker to be used will weigh 5.783 pounds.

Using this information, we must determine an allowable energy output for which the stresses in the spring do not exceed the allowable stresses specified.

First, we determine the allowable energy output as found using conventional design. The maximum force range ($P_R$) which the spring can withstand without being overstressed is given by conventional design formulas. For circular wire, we obtain:

$$P_R \text{ allowable} = \frac{\pi d^3 S_{R\ allowable}}{8DC} =$$

$$\frac{\pi(0.688)^3(41,200)}{8(3.50)(1.301)} = 1156 \text{ lb.}$$

The maximum allowable static force is now found using the conventional design equation:

$$P_{max} \text{ allowable} = \frac{\pi d^3 S_{max\ allowable}}{8DC} =$$

$$\frac{\pi(0.688)^3(61.800)}{8(3.50)(1.301)} = 1734 \text{ lb}$$

Therefore since the maximum allowable stress is 61,800 p.s.i., the maximum force which can be applied to the spring without overstressing will be:
$P_{max}=1734$ lb.

The total weight of the active coils ($Wac$) is found by:

$$Wac = \left(\frac{\pi d^2}{4}\right)(\pi D \rho N) = \frac{\pi^2 (0.688)^2 (3.50)(0.283)(5)}{4}$$

$$Wac = 5.783 \text{ lb.}$$

where $\rho$ is the unit weight of the material.

The spring rate of the active coils (K) is found from $$K = \frac{Gd^4}{8ND^3} = \frac{(11.5 \times 10^6)(0.688)^4}{8(5)(3.5)^3} = 1500 \text{ lb./in.}$$

Therefore, we find that for this case:

$$P_R/Ws = \frac{1156}{5.783} = 200$$

$$P_{max}/Ws = \frac{1734}{5.783} = 300$$

$$Ws/Wac = \frac{5.783}{5.783} = 1$$

FIGURE 20 is a design curve based on conventional design to determine how much energy a given spring could safely release without overstressing the spring. The conventional design energy output is found by entering $P_R/Ws = 200$ and projecting upward to the curve for $P_{max}/Ws = 300$. From this point project to the left to determine $UK/Ws^2 = 40,000$.

Therefore, according to conventional design, the maximum safe energy output is:

$$U = \frac{Ws^2}{K}(40,000) = \frac{(5.783)^2(40,000)}{1500} = 891 \text{ in./lb.}$$

or $$U = 74 \text{ ft./lb.}$$

However, since inertia surge is not accounted for by conventional design, an energy output of 74 foot pounds would cause rapid failure of the spring due to overstressing as will now be shown.

Referring to FIGURE 21 (since $Ws/Wac = 1$), let us determine the true stress range corresponding to the proposed energy output of 74 pounds.
For this problem:

$$(UK/Ws^2)_{Prob} = \frac{(74 \text{ ft./lbs.})(12 \text{ in./ft.})(1500 \text{ lbs./in.})}{(5.783 \text{ lbs.})^2}$$

$$= 40,000$$

Converting this to a base value by Equation 18:

$$(UK/Ws^2)_{Base} = \frac{(UK/Ws^2)_{Prob}(1000)^2}{(P_{max}/Ws)^2_{Prob}}$$

$$= \frac{(40,000)(1000)^2}{(300)^2} = 444,000$$

Entering the inertia surge design curve (FIGURE 21) at $(UK/Ws^2)_{Base}$ equal to 444,000 and projecting to the right, we find the value of $(P_R/Ws)_{Base}$ is 1465. Using Equation 17 to convert $(P_R Ws)_{Base}$ to $(P_R/Ws)_{Prob}$:

$$(P_R/Ws)_{Prob} = \frac{(P_R/Ws)_{Base}(P_{max}/Ws)_{Prob}}{(1000)}$$

$$= \frac{(1465)(300)}{(1000)} = 439.5$$

Therefore, the dynamic force range which actually will be imposed on the power spring is $$P_R = 439.5 (Ws) = (439.5)(5.783) = 2540 \text{ lb.}$$

from which the actual stress range is seen to be $$\text{Actual stress range} = \frac{(2540)}{(1156)}(41,200) = 90,500 \text{ p.s.i.}$$

Obviously this value greatly exceeds the allowable stress range of the material and rapid failure will occur.

Therefore, in order to select a spring having stresses winthin desired limits, it is imperative to account for the effects to inertia surge. For example, the true allowable energy output for the spring previously discussed will now be determined.

Using Equation 17, we find $$(P_R/Ws)_{Base} = \frac{(1000)(P_R/Ws)_{Prob}}{(P_{max}/Ws)_{Prob}} = \frac{(1000)(200)}{300} = 667$$

Entering $(P_R/Ws)_{Base} = 667$ (see FIGURE 21), and projecting upward to the "base curve" (i.e. the inertia surge design curve for $P_{max}/Ws = 1000$) then projecting to the left, we find $(UK/Ws^2)_{Base}$ to be 94,000. Converting $(UK/Ws^2)_{Base}$ to $(UK/Ws^2)_{Prob}$ by using Equation 18, we obtain $$(UK/Ws^2)_{Prob} = \frac{(UK/Ws^2)_{Base}(P_{max}/Ws)^2_{Prob}}{1000^2}$$

or $$UK/Ws^2 = \frac{(300)^2(94,000)}{(1000)^2} = 8,460$$

Therefore, the energy output that the spring will actually deliver without exceeding the allowable stress range of the material is $$U = \frac{Ws^2}{K}(8,460) = \frac{(5.783)^2(8,460)}{1500} = 189 \text{ in. lb.}$$

or $$U = 16 \text{ ft. lb.}$$

Therefore, since this spring has a maximum safe energy output of 16 foot pounds rather than 74 foot pounds as determined by conventional design, the conventional design is in error by 460%.

It should be noted that even if the designer (using conventional methods) happened to use a safety factor of two (i.e. if he used an energy output of only one-half the conventional allowable) the spring would still fail since the resulting stress range caused by inertia surge (as found from FIGURE 21) would be approximately 64,000 p.s.i. and would therefore still exceed the allowable stress range of 41,200 p.s.i.

While some springs in the past have been provided with a "dead" coil, the use of these coils to overcome inertia surge has not been appreciated. Referring to FIGURE 11, an improvement is made by adding additional coils to the end of the spring opposite the striker 24, these coils being "dead" or "preloaded closed" during operation of the spring. The term "preloaded closed coils" shall hereafter refer to coils of the spring which are active at loads less than $P_{min}$, but which close (i.e. touch adjacent coils) at loads greater than $P_{min}$. Obviously, any number of coils may be preloaded closed but there are many instances when preloaded closed coils are not beneficial, and often a single preloaded closed coil is just as good as say five or ten. To demonstrate the effect of preloaded closed coils, the following example is given.

Referring to FIGURE 12 the spring has been compressed an amount $(Z_1 - Z_2)$ by a force $P_{min}$. The coil 33d has just become preloaded closed (i.e. it can be compressed no more since it is in contact with coil 33e).

FIGURE 13 shows the spring with the maximum force ($P_{max}$) applied to store the required energy in the spring. The additional force $P_{max} - P_{min}$ will be absorbed by the coils 33a, 33b, and 33c since coil 33d cannot be further compressed.

Referring to FIGURE 14, the force $P_{max}$, is then removed and the energy stored in the spring accelerates the striker 24 downward an amount $Z_2$, whereupon it transfers energy to the tool 28 to provide the impact blow. As shown earlier, coils 33a, 33b, and 33c have attained high downward velocities, and inertia surge causes these coils to pile up on the back of the striker 24, as illustrated in FIGURE 14. However, this now allows the upper coil 33d to open from its preloaded closed position, as shown in FIGURE 15. Although inertia surge still increases the actual stress range of the coils far above the static stress range given by conventional solutions, the effect of inertia surge can be greatly reduced since the preloaded closed coil (33d) tends to push down on coils 33a, 33b, and 33c thereby reducing their tendency to open and consequently reducing the stress range.

In a manner similar to that for springs having no coils preloaded closed, dimensionless plots for springs having preloaded closed coils are included in FIGURES 22 through 29.

Since any number of coils may be preloaded closed, an additional parameter must now be included. This parameter is designated as R, where R is the percent of preloaded closed coils added to the spring. For example, if one preloaded closed coil is added to a spring having 5 active coils, R would be 20%. Obviously, springs having no preloaded closed coils have a value $R=0\%$.

To demonstrate the value of using preloaded closed coils, we will use the previous example except that in this case one preloaded closed coil will be added to the spring.

Therefore, the spring now has five active coils and one preloaded closed coil.

Since the true maximum safe energy output for this spring with no preloaded closed coils has been determined, we shall now determine the true maximum safe energy output for this spring if one preloaded closed coil is added.

Since the same spring will be used, the following parameters will be the same as in the previous example:

$P_{R \text{ allowable}} = 1156$ lb.
$P_{\text{max allowable}} = 1734$ lb.
$Wac = 5.783$ lb.
$K = 1500$ lb./in.

As before, the dimensionless ratios are:

$P_R/Ws = 200$
$P_{\max}/Ws = 300$
$Ws/Wac = 1$

The new dimensionless ratio (R) is the percentage of preloaded closed coils which have been added to the original spring:

$$R = \frac{1}{5} \times 100 = 20\%$$

As before, $P_R Ws = 1156$ must be converted to a base value using Equation 17, which will again give $(P_R/W_s)_{\text{Base}}$ equal to 667. To find the true allowable energy output for the spring with a preloaded closed coil (see FIGURE 24, since $Ws/Wac=1$), enter $(P_R/Ws)_{\text{Base}} = 667$, and project upward to the inertia surge design curve for $R=20\%$. From this point, we project to the left to determine that $(UK/Ws^2)_{\text{Base}} = 147,000$. Converting $$(UK/Ws^2)_{\text{Base}}$$

to $(UK/Ws^2)_{\text{Prob}}$ we find, using Equation 18:

$$(UK/Ws^2)_{\text{Prob}} = \frac{(P_{\max}/Ws)^2_{\text{Prob}}(UK/Ws^2)_{\text{Base}}}{(1000)^2}$$

$$= \frac{(300)^2(147,000)}{(1000)^2} = 13,000$$

Therefore, the energy output that the spring will now safely deliver, when it has 20% additional preloaded closed coils is:

$$U = \frac{Ws^2}{K}(13,000) = \frac{(5.783)^2(13,000)}{1500} = 290 \text{ in. lb.}$$

or $U = 24$ ft. lb.

Therefore, the same spring having one preloaded closed coil added has a maximum safe energy output of 24 foot pounds rather than 16 foot pounds as determined for the identical spring having no preloaded closed coils. This gives an additional amount of energy of 8 foot pounds or an increase of 50% in the allowable energy output.

As shown in the previous example, adding preloaded closed coils to a power spring may often reduce the stress range in the spring. However, there are instances where the addition of preloaded closed coils does not significantly affect the stress range in the spring. For example, let us determine the effect of adding a second preloaded closed coil to the spring of the previous example.

In this case the only change will be the percent of preloaded closed coils, which is now equal to 40% rather than 20%. Using the same approach as in the previous example, we find that the value of $UK/Ws^2$ is the same for $R=40\%$ as for $R=20\%$ and so there would be no advantage in adding a second preloaded closed coil.

It should also be noted that while the ratio $Ws/Wac$ does not affect conventional design, it greatly influences the actual behavior of the power spring, as shown in FIGURE 30 through 35 in which $P_R/Ws$ is plotted against percent of conventional design energy output for various values of $Ws/Wac$. For instance, from FIGURE 30 we see that a spring having $P_{\max}/Ws = 1000$, $P_R/Ws = 500$, $$Ws/Wac = \frac{1}{4}$$

and $R=0\%$ can safely release only about 6% of the conventional design energy output while if $Ws/Wac$ is increased to 5.0, this percentage jumps to 51%. This increase is due solely to the increased weight of the striker. In other words, inertia surge effects are reduced the larger the ratio $Ws//Wac$ becomes and thus more energy may be released. Actually, the conventional design curves are only correct for the value $Ws/Wac = \infty$.

Using the same spring as in the previous example (for $R=0\%$), we can illustrate the use of FIGURES 30 through 35. The information used in the previous example is identical:

$Ws = 5.783$ lb.
$K = 1500$ lb./in.
$P_R/Ws = 200$
$P_{\max}/Ws = 300$
$Ws/Wac = 1$
$R = 0\%$ Using Equation 18, to convert $(P_R/Ws)_{\text{Prob}}$ to $$(P_R/Ws)_{\text{Base}}$$

we again find:

$$(P_R/Ws)_{\text{Base}} = 667$$

Entering FIGURE 30 at $(P_R/Ws)_{\text{Base}} = 667$, and projecting upward to the curve for $Ws/Wac=1$, we find the percent of conventional energy to be 21.2%. From the previous example, the conventional energy output was found to be 74 foot pounds, therefore, the true energy output will be $$U = (0.212)(74 \text{ ft. lbs.}) = 16 \text{ ft. lbs.}$$

This is the same result as was obtained in the previous example.

Another set of curves stressing the importance of the striker weight is shown in FIGURES 36 through 41 in which $UK/Wac^2$ is plotted against $Ws/Wac$ for various values of $P_R/Wac$ for a base of $P_{\max}/Wac$ equal to 1000.

The same power spring used in the previous example will be used here. The resulting dimensionless ratios are:

$(P_R/Wac)_{\text{Prob}} = 200$
$(P_{\max}/Wac)_{\text{Prob}} = 300$
$(UK/Wac^2)_{\text{Prob}} = 8,460$
$R = 0\%$ Equations similar to Equations 15 and 16 must be used to convert the "problem" values to the values of the base curves. These equations are:

$$\frac{(P_R/Wac)_{\text{Prob}}}{(P_R/Wac)_{\text{Base}}} = \frac{(P_{\max}/Was)_{\text{Prob}}}{(P_{\max}/Wac)_{\text{Base}}}$$

Equation 19

$$\frac{(UK/Wac^2)_{\text{Prob}}}{(UK/Wac^2)_{\text{Base}}} = \frac{(P_{\max}/Wac)^2_{\text{Prob}}}{(P_{\max}/Wac)^2_{\text{Base}}}$$

Equation 20

Using Equations 19 and 20 we find:

$(P_R/Wac)_{Base} = 667$ $(UK/Wac^2)_{Base} = 94{,}000$

Referring to FIGURE 36 and entering at $$(UK/Wac^2) = 94{,}000$$

we project to the right to $(P_R/Ws)_{Base} = 667$ curve which is interpolated on the graph. Then project downward to find the minimum $Ws/Wac$ allowable to prevent failure due to inertia surge. From this curve the minimum value is found to be $Ws/Wac = 1$.

As previously mentioned, another cause of spring failure is harmonic surge. The general practice in the spring industry is to avoid harmonic surge by maintaining the ratio of the natural resonant frequency of the spring to the operational frequency to at least 14 to one. However, as has been previously pointed out, the choice of spring dimensions and operating conditions is critical if inertia surge is to be controlled. Because of the critical sizes of power springs that must be utilized to control inertia surge, a satisfactory power spring may have a very low ratio of natural frequency to the desired operational frequency and would, therefore, be subject to harmonic surge. Therefore, harmonic surge would build up in the spring and would lead to spring failure due to an excessive maximum stress and/or an excessive stress range.

However, after closely analyzing the nature of harmonic surge and inertia surge, we have found that the concept of inertia surge answers several questions regarding the action of harmonic surge and is controlled.

Referring to FIGURE 16, let us assume that the coils 32a, 32b, and 32c have been compressed by the static force $P_{max}$, thereby storing energy in the spring.

After the striker is released it is forced downward until, at the instant of impact, the striker and coils have attained high downward velocities. As previously mentioned kinetic energy stored in the coils because of their velocities causes a downward inertia surge of the coils as illustrated in FIGURE 18.

The conventional method avoiding harmonic surge is to dissipate this inertia surge energy before the next cycle by the action of material dampening. So long as the ratio of the natural resonant frequency of the spring to the operating frequency is sufficiently large, the spring will have time to oscillate several times before the next cycle; this oscillation causes internal dampening which dissipates the undesirable inertia surge energy.

However, if the spring must be re-cycled before the inertia surge energy stored in the coils is dissipated, additional energy will be stored in the spring. Further, because each cycle stores more energy in the spring than can be dissipated in the form of heat by internal dampening the coils will vibrate with ever increasing amplitudes resulting in harmonic surge, and rapid failure of the spring.

This suggests that harmonic surge can be controlled as long as the harmonic surge energy stored in the spring can be limited. Therefore, if the inertia surge energy stored in the spring during each cycle is dissipated once each cycle rather than allowing it to build up, harmonic surge cannot become excessive.

We have found that this energy can be dissipated in several ways, the simplest of which is by having adjacent oscillating coils contact or touch each other on the compression stroke, thereby dampening the oscillations before they can build up a magnitude such that the allowable stresses of the spring are exceeded. This is accomplished by spacing the coils such that on the compression stroke one or more coils, and preferably all of these coils, touch an adjacent coil whenever the harmonic oscillations attempt to build up above a safe level, thereby limiting the harmonic surge energy and controlling harmonic surge.

The use of the clashing of adjacent coils to limit harmonic surge is, of course, applicable to power springs in general. However, since the most common power springs have a constant wire size, mean diameter, and pitch, the following discussion will be limited to this type.

FIGURE 2 represents a typical coil power springs in its unloaded position, wherein the coil spacing is $X_0$. There is no energy stored in the spring in this position.

FIGURE 16 represents the spring after the static force $P_{max}$ has caused the striker to deflect upwards an amount $Z_1$, thereby reducing the coil spacing to $X_1$ and storing potential energy in the spring. This stored energy is given by:

Figure 1:
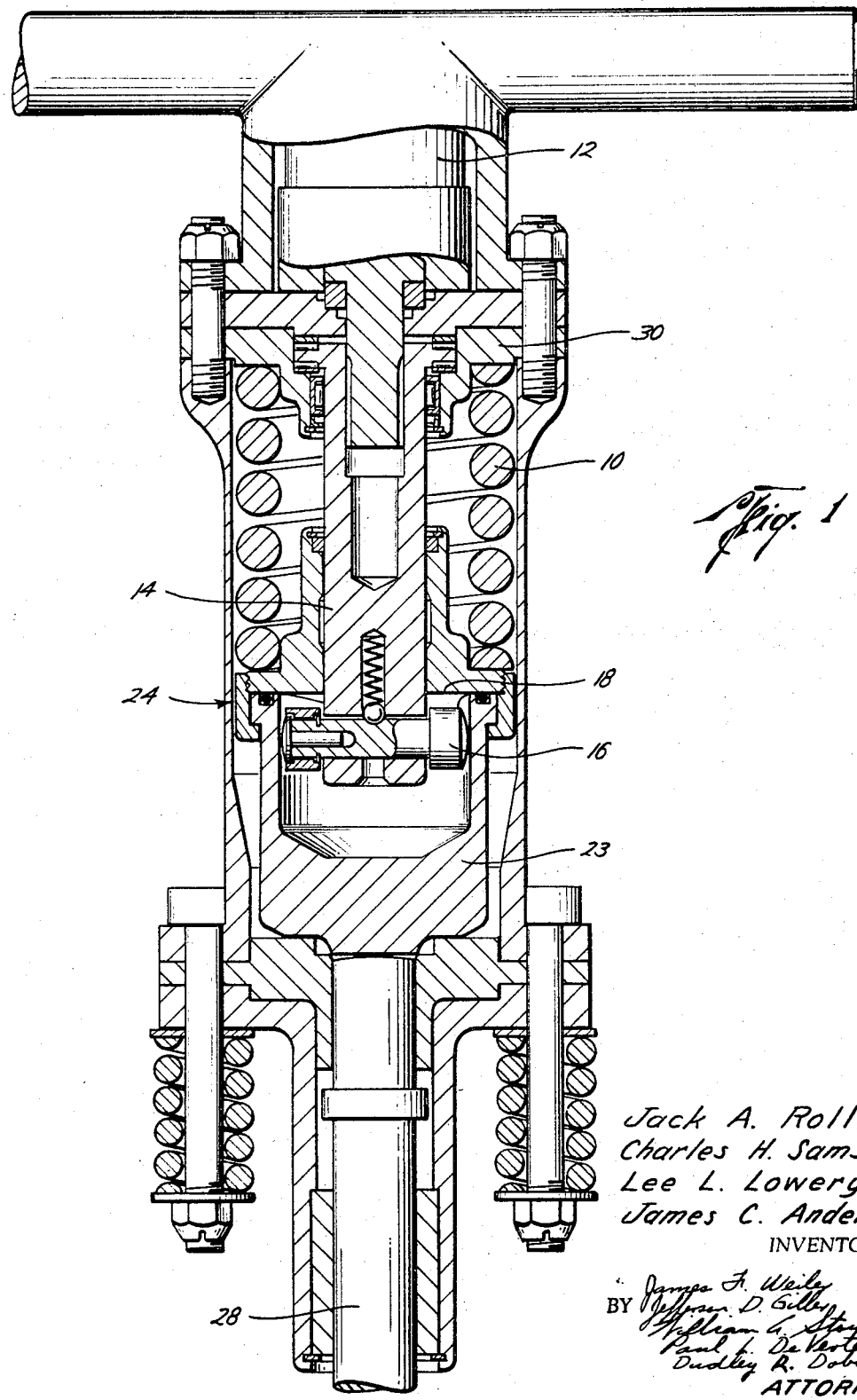
Figure 7:
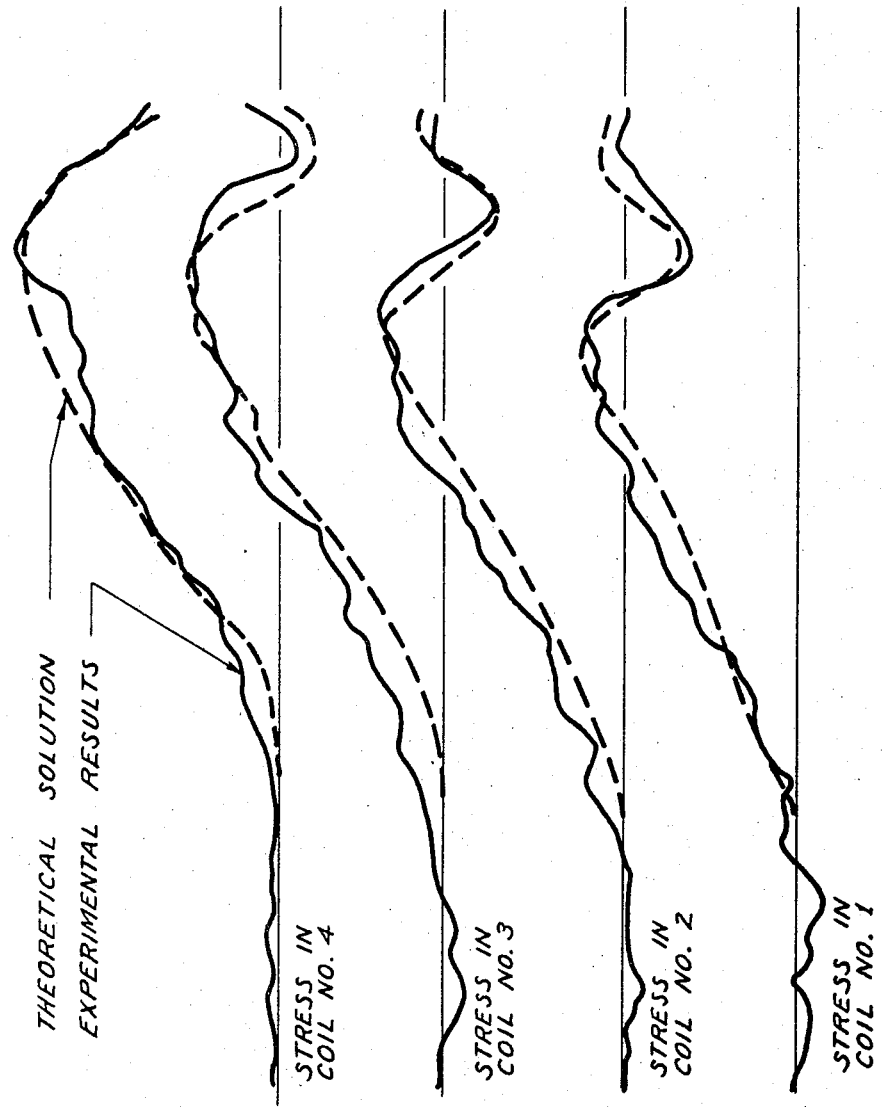
Figure 8:
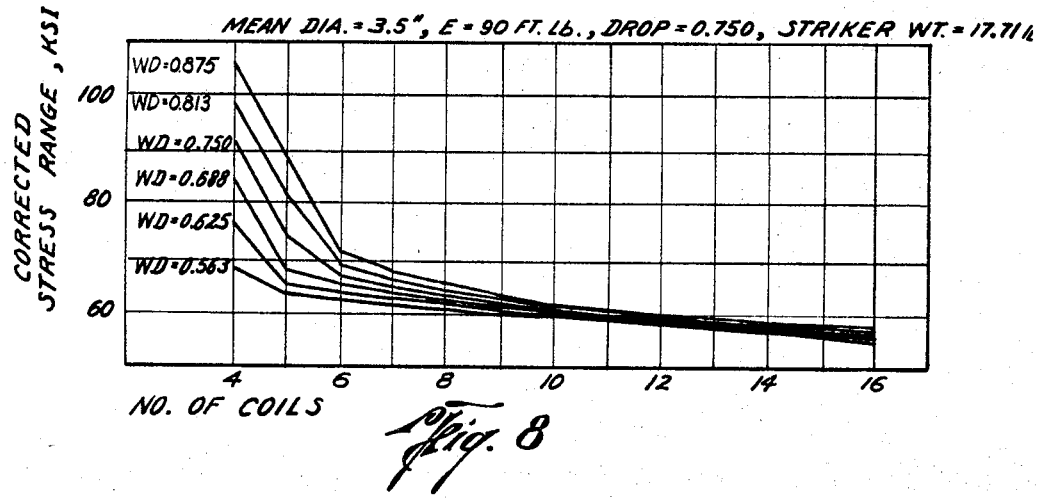
Figure 9:
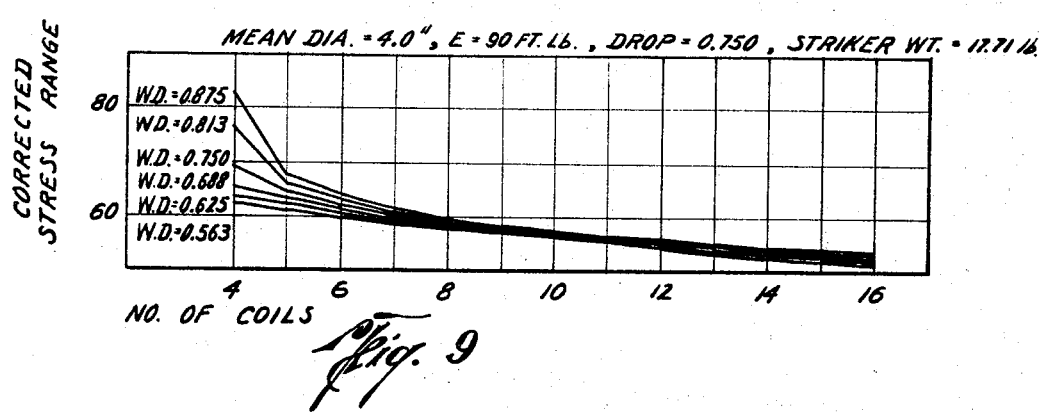
Figure 10:
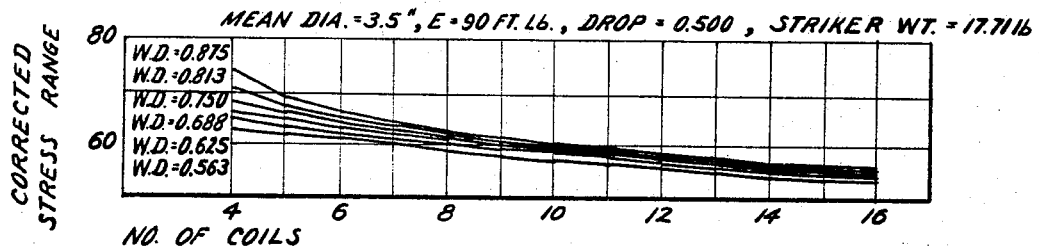
Figure 20:
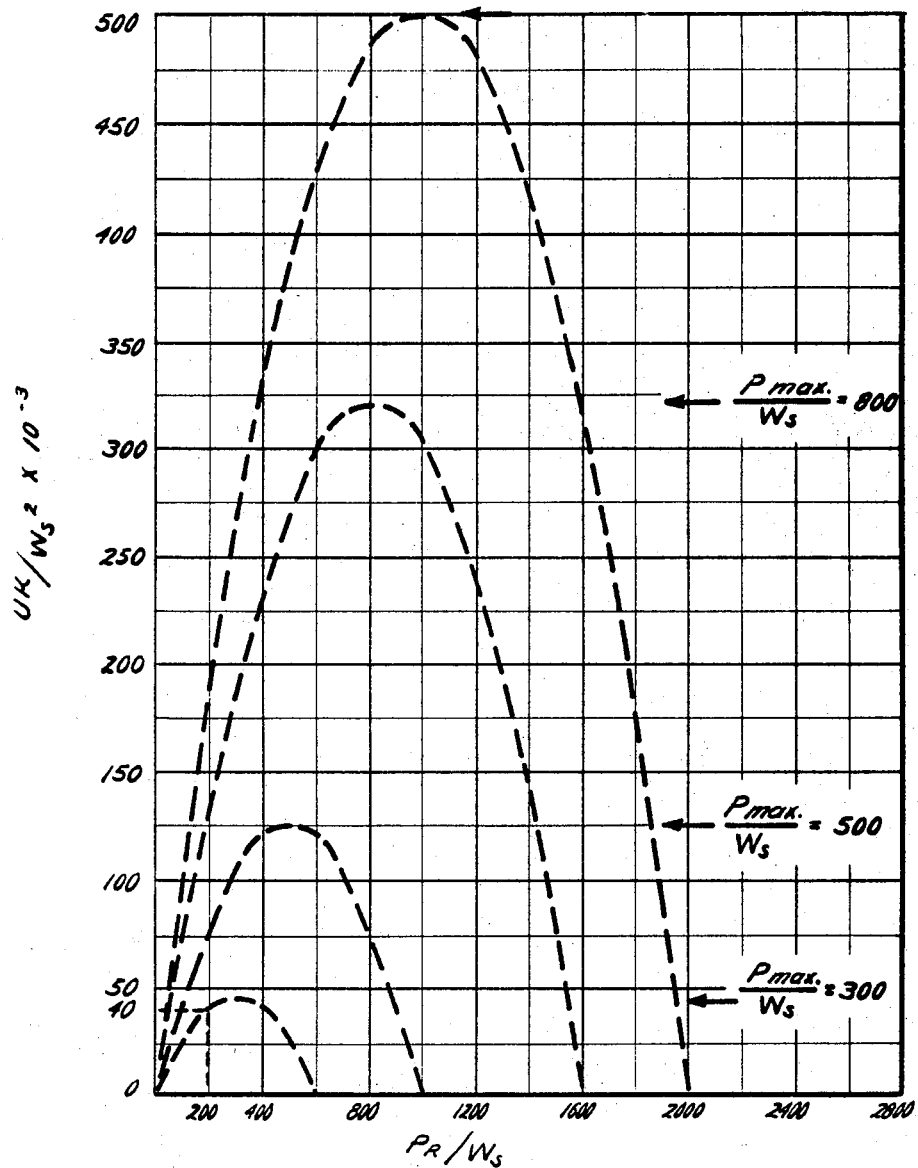
Figure 21:
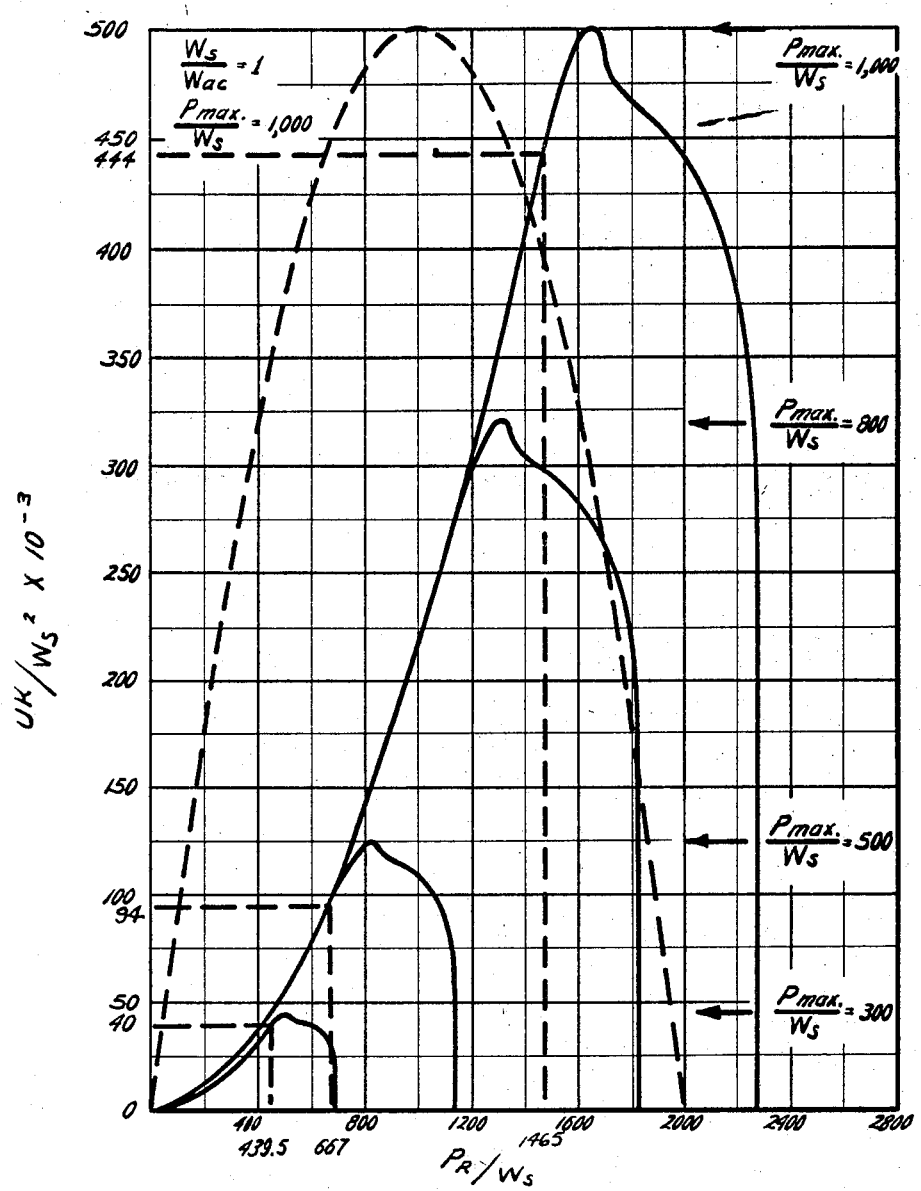

$$E_{static} = \frac{P_{max} \cdot Z_1}{2} \qquad \text{Equation 21}$$

However, if the distance $X_1$ is greater than the wire diameter $d$, (i.e., unless the spring is compressed solid), it is still possible that more energy than $E_{static}$ can be stored in the spring. This additional energy, which we have termed "harmonic surge energy," arises from any undampened coil oscillations from previous impact blows, and can effect the spring as illustrated in FIGURE 17, wherein the addition of harmonic surge energy has caused the upper coils to close. Since this clashing of the upper adjacent coils limits the coil deflections, it also limits the maximum harmonic surge energy that can be stored in the spring.

In order to solve for the harmonic surge energy stored in the spring, we may assume that the coil deflections illustrated in FIGURE 17 are the result of an externally applied force $F_1$. Since this force is initially zero and increases linearly to the value $F_1$, the additional energy stored will be given by $$E_{harmonic\ surge} = (\text{Avg. Force})(\text{Distance Traveled})$$

$$= \frac{(F_1)}{2}(\Delta_1)$$

But $$\Delta_1 = (X_1 - d)(N - 1)$$

and $$F_1 = \Delta_1 \frac{KN^2}{N-1} = (KN^2)(X_1 - d)$$

Thus $$E_{harmonic\ surge} = \frac{(X_1 - d)^2 (KN^2)(N-1)}{2}$$

Equation 22 where $X_1$ and $d$ are as shown in FIGURE 16, $K$ is the spring rate of the spring, and $N$ is the total number of active coils.

The system shown in FIGURE 18 shows only the effects of inertia surge, harmonic surge not yet being considered. As was mentioned previously, the high downward coil velocities store kinetic energy in the spring during each cyle. This inertia surge energy stored in the spring causes the increased coil deflections shown in FIGURE 18 (i.e., the "piling up" of the coil on the top of the striker).

In a similar manner, the harmonic surge energy ($E_{harmonic\ surge}$) stored in the spring may force these coils to deflect even further, as illustrated in FIGURE 19. Since Equation 22 gives the amount of harmonic surge energy stored in the spring, the additional downward deflection $\Delta_2$ caused by harmonic surge can be determined.

This is again done by assuming the deformation to be caused by an external force $F_2$. Equating the harmonic surge energy stored in the spring with the work done by the force $F_2$ moving through the distance $\Delta_2$:

$$\frac{F_2}{2} \Delta_2 = E_{harmonic\ surge}$$

But $$F_2 = \Delta_2 \frac{KN^2}{N-1}$$

Therefore:

$$\frac{\Delta_2^2 KN^2}{2(N-1)} = E_{\text{harmonic surge}} \quad \text{Equation 23}$$

Substituting Equation 22 into Equation 23:

$$\frac{(X_1-d)^2 KN^2 (N-1)}{2} = \frac{\Delta_2^2 KN^2}{2(N-1)}$$

Solving for $\Delta_2$:

$$\Delta_2 = (N-1)(X_1-d) \quad \text{Equation 24}$$

where $X_1$, $d$, and $\Delta_2$ are as shown in FIGURES 16 and 19, and N is the total number of active coils.

Therefore, Equation 24 gives the additional downward deflection of the top coil due to harmonic surge.

Therefore, as illustrated in FIGURES 17 and 19 there is an additional force range due to harmonic surge, $P_{RHS}$ which is given by $$P_{RHS} = (X_1 - d + \Delta_2)(KN) \quad \text{Equation 25}$$

Figure 22:
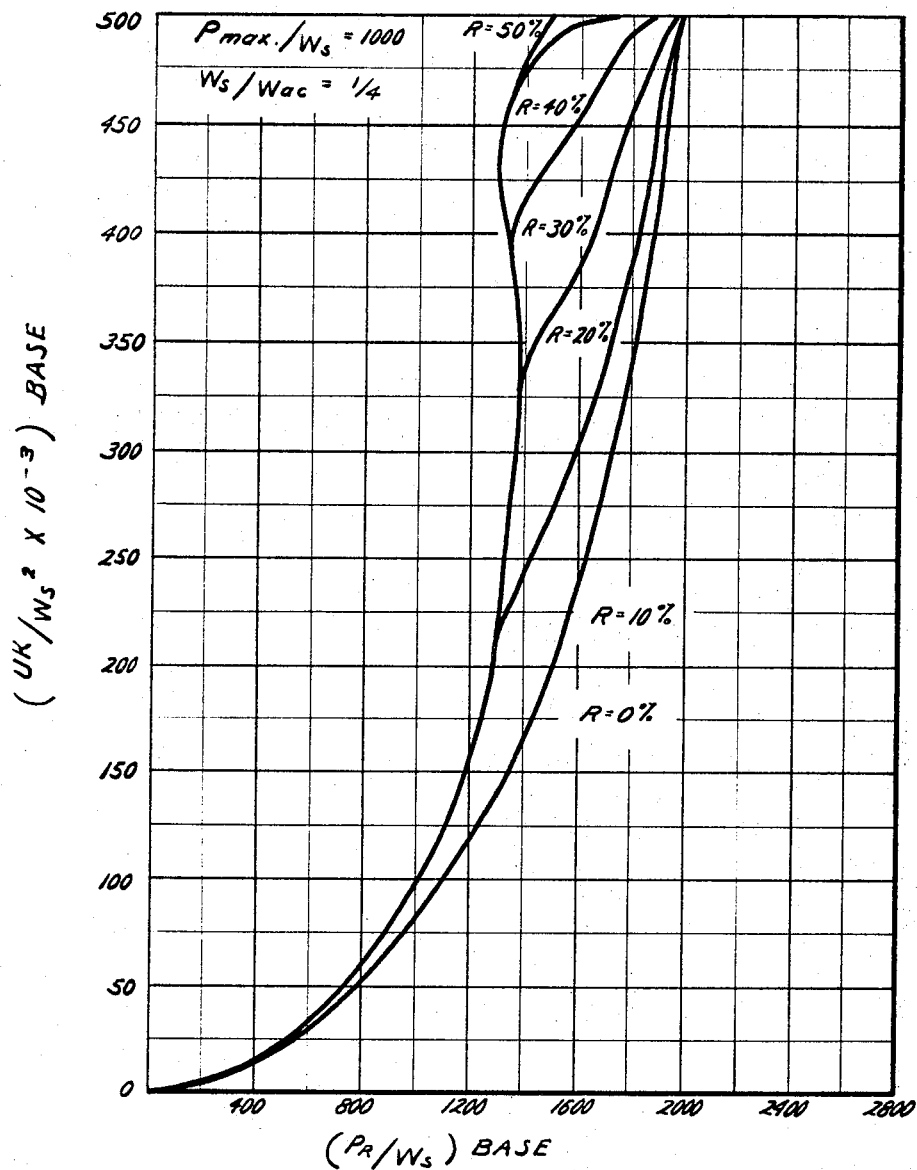
Figure 23:
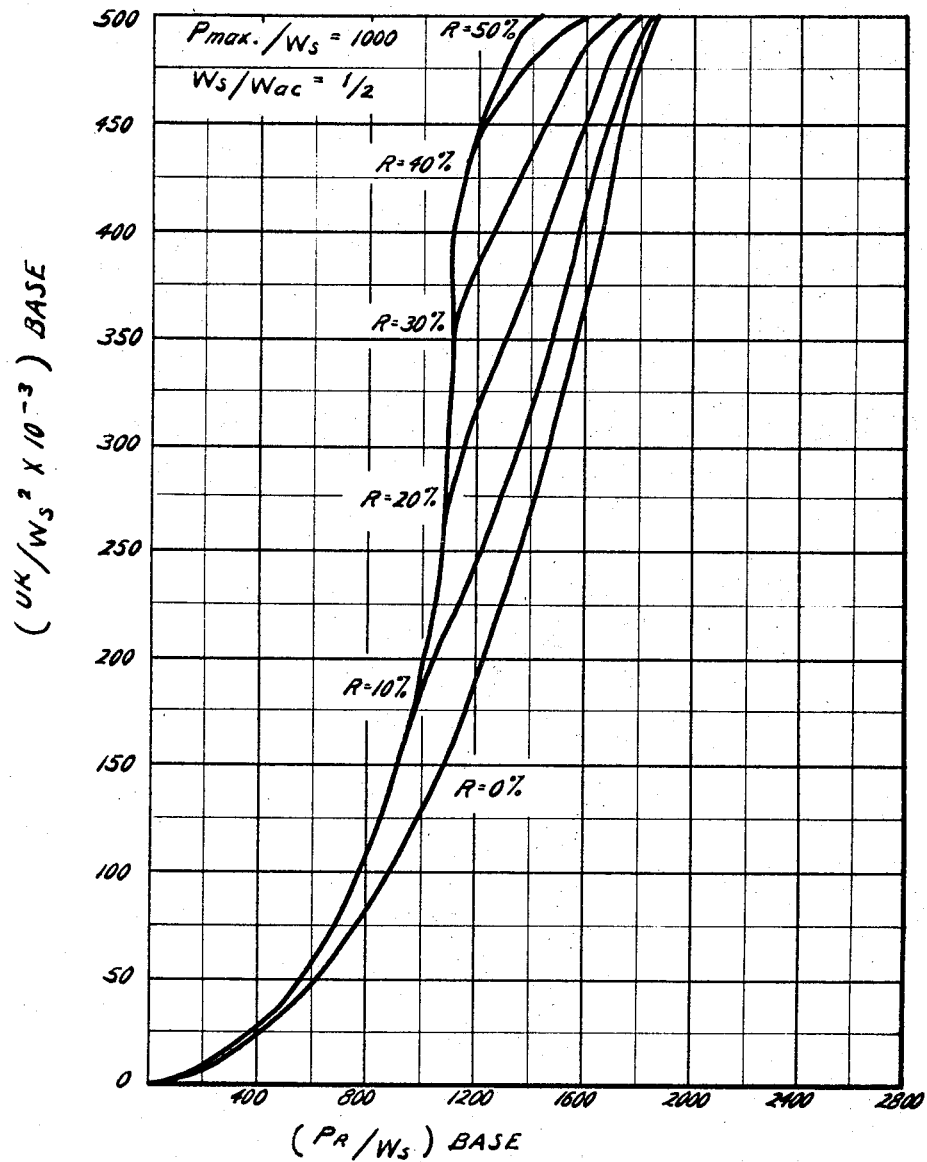
Figure 24:
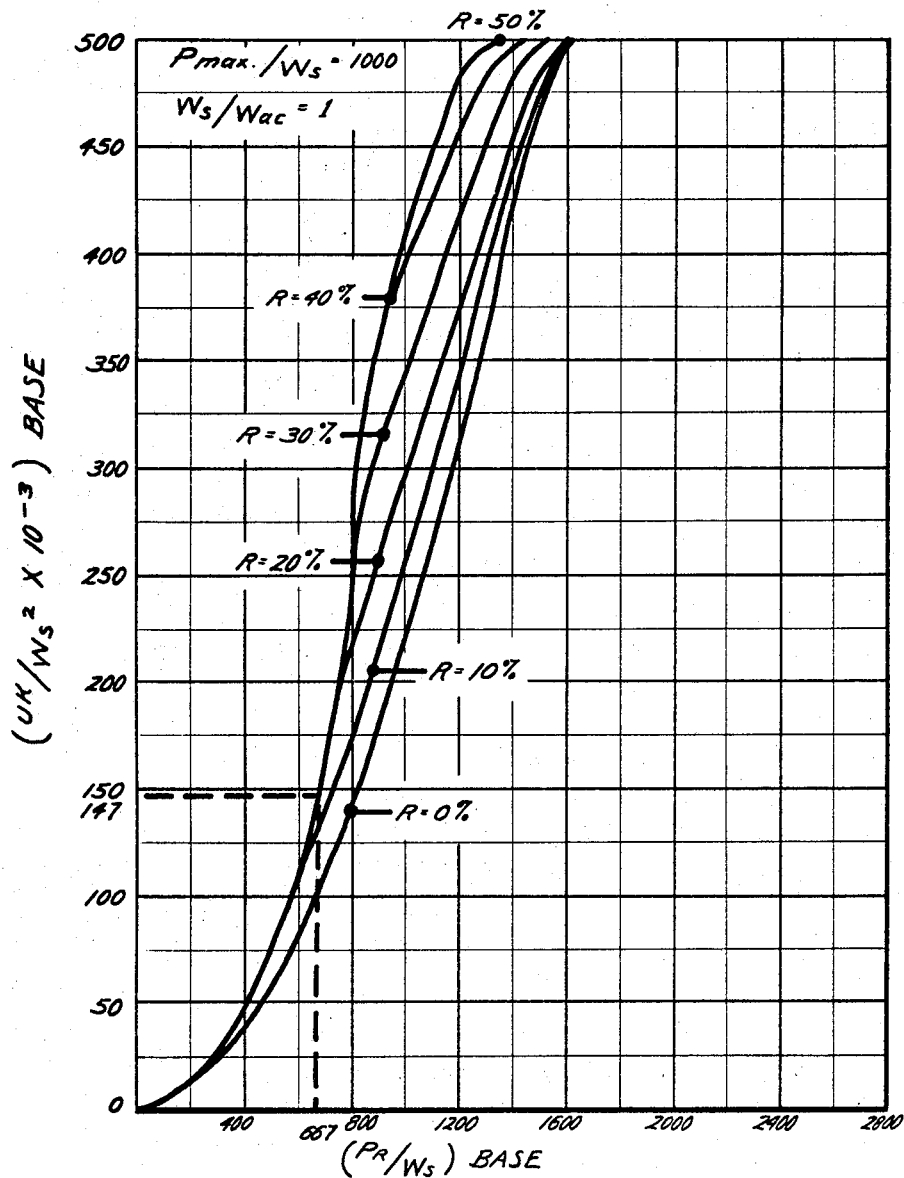
Figure 25:
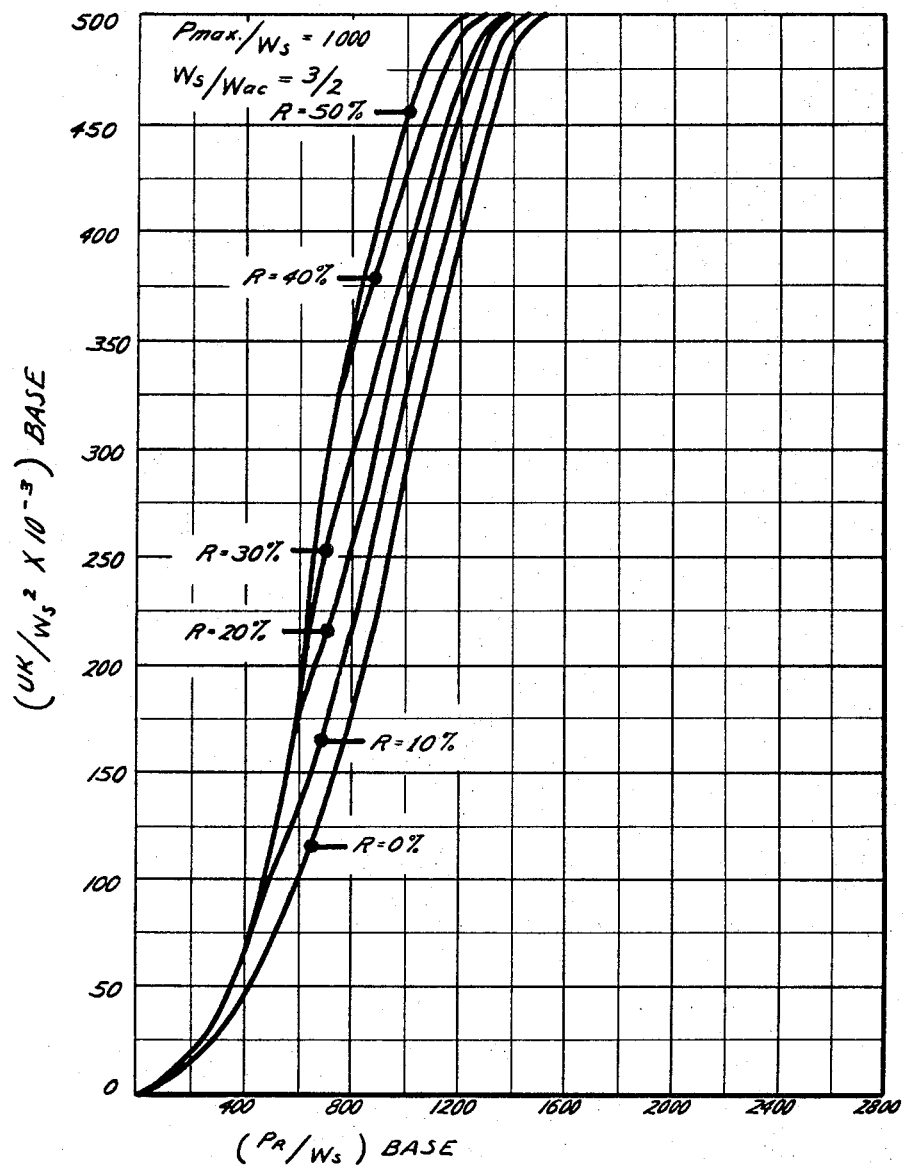
Figure 26:
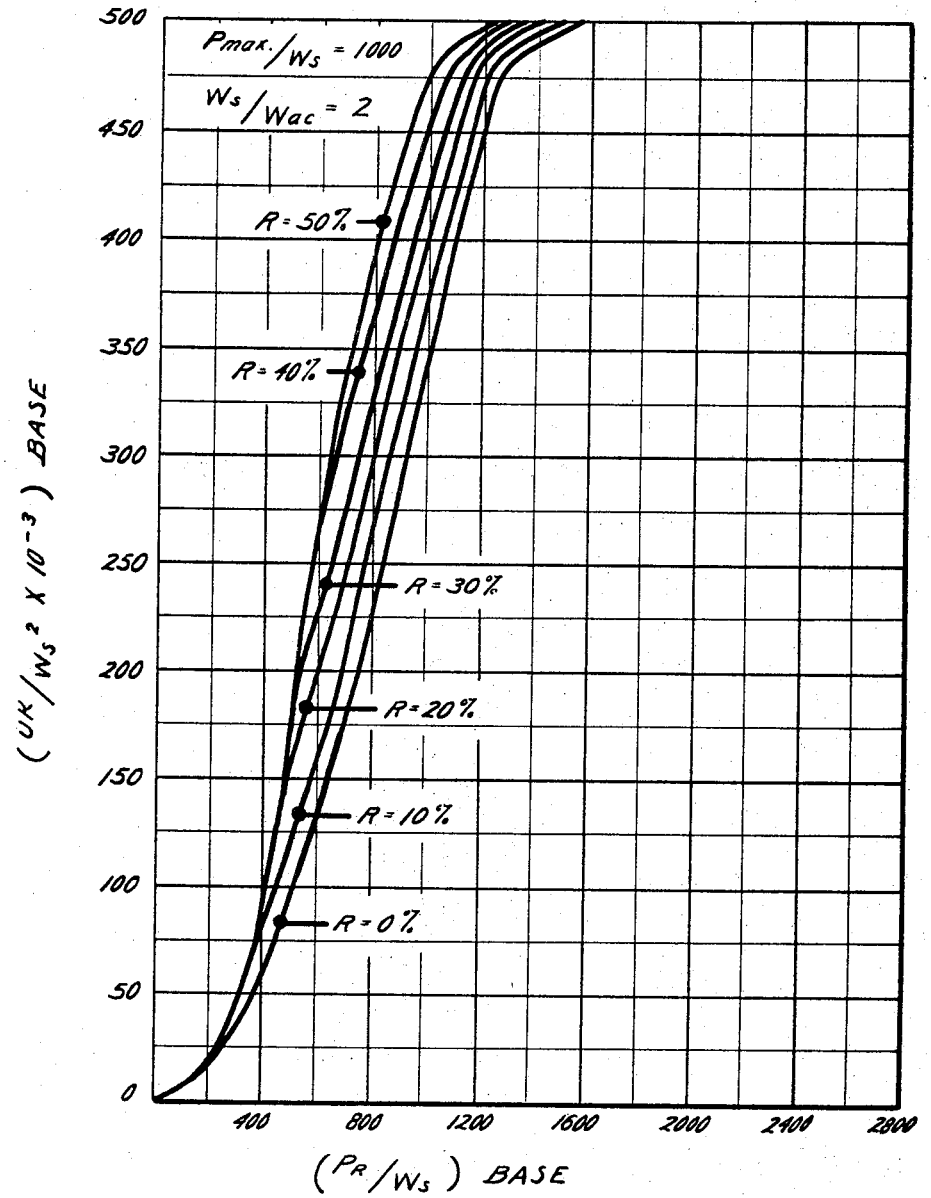
Figure 27:
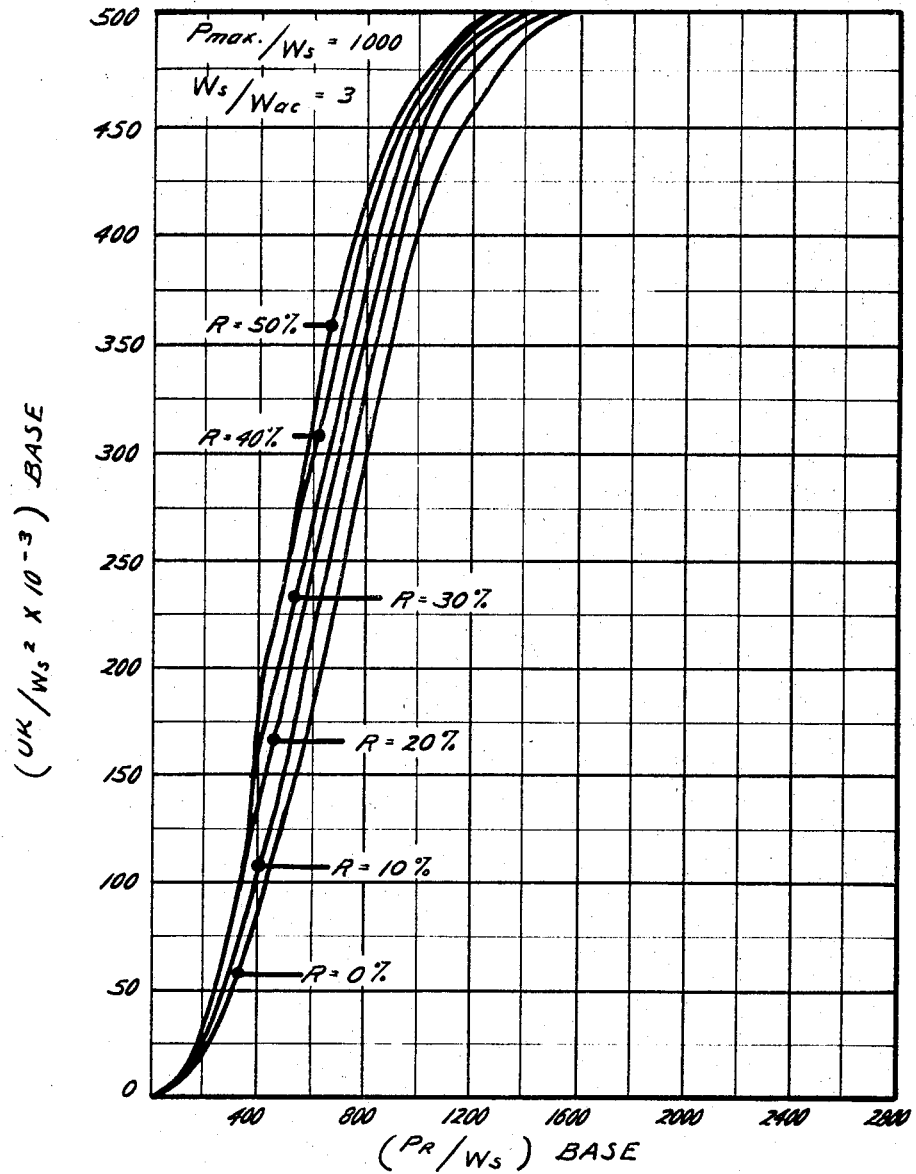
Figure 28:
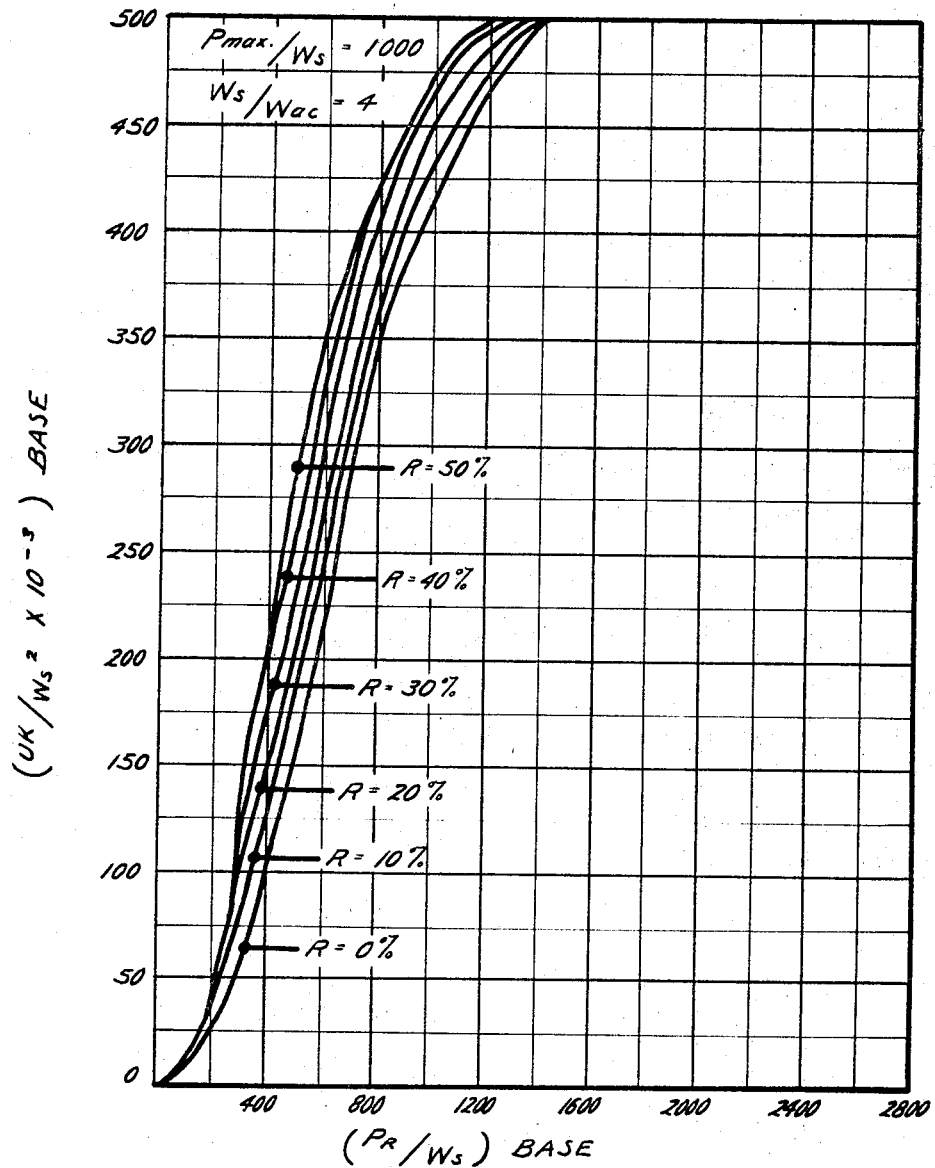
Figure 29:
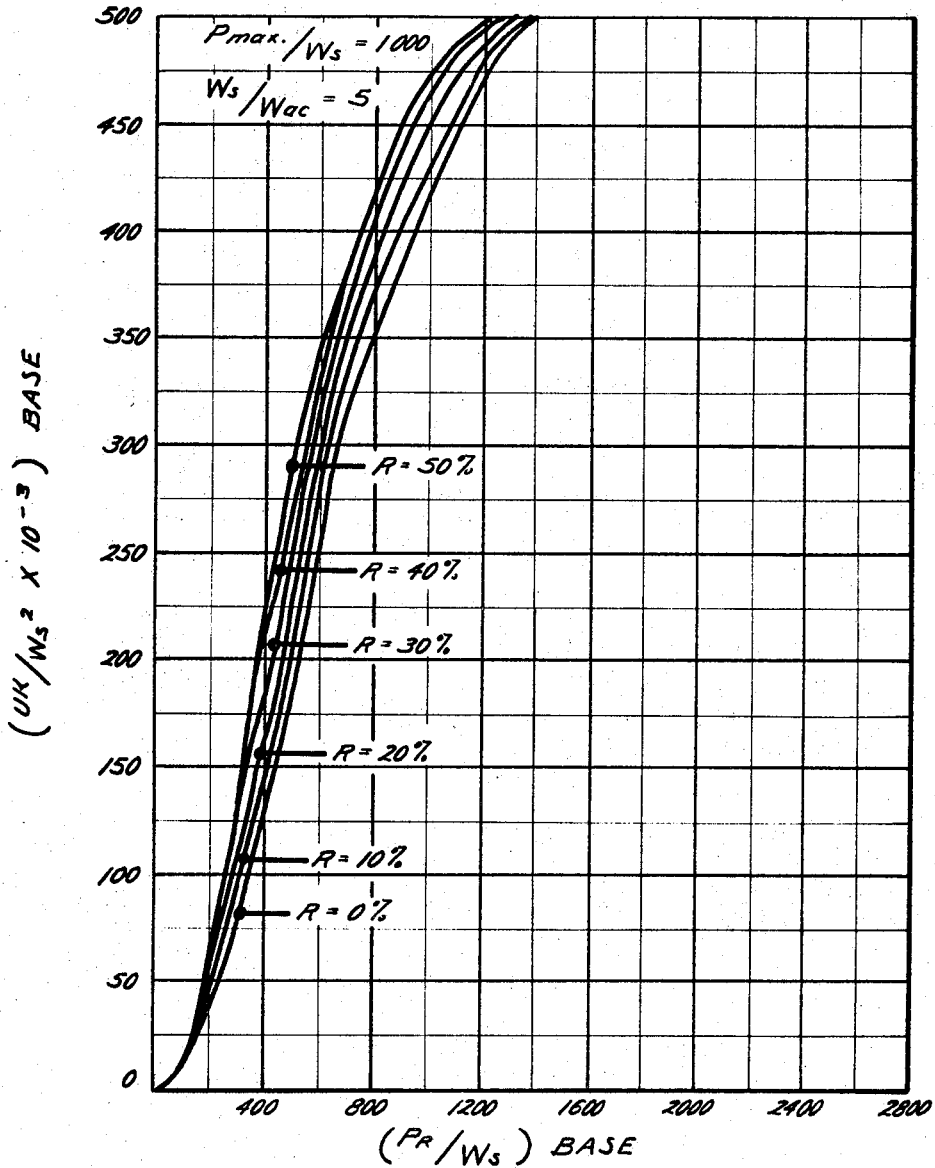

Using Equations 24 and 25:

$$P_{RHS} = KN^2(X_1 - d) \quad \text{Equation 26}$$

where $P_{RHS}$ is the additional force range due to harmonic surge, N is the total number of active coils, $X_1$ is as shown in FIGURE 16, and K is the spring rate of the active coils of the spring. Thus $X_1$ must be made small enough so that $$P_R + P_{RHS} \leq P_R \text{ allowable} \quad \text{Equation 27}$$

where $P_R$ is found using FIGURES 22 through 29, and $P_{RHS}$ is given by Equation 26. Therefore, it follows that $$X_1 \leq \frac{P_{R\text{ allowable}} - P_R}{N^2 K} + d$$

Equation 28 or for springs in general, $$X_1 \leq \frac{P_{R\text{ allowable}} - P_R}{N^2 K} + W$$

Equation 28a and therefore $$X_0 \leq \frac{P_{R\text{ allowable}} - P_R}{N^2 K} + d + Z_1/N$$

Equation 29 or for springs in general $$X_0 \leq \frac{Z_1 K}{K_c} + \frac{P_{R\text{ allowable}} - P_R}{NK_c} + W$$

Equation 29a

Also, as illustrated in FIGURE 17, the clashing of the coils due to harmonic surge may increase the maximum force in the spring above the static value $P_{max}$. Thus, the coil spring $X_0$ shown in FIGURE 2 must also be small enough so that when the coils clash, the resulting stress will not exceed the maximum allowable stress. For circular wire this requirement is given by:

$$X_0 \leq \frac{(S_{max.\text{ allowable}}) \pi d^3}{8KNDC} + d$$

Equation 30 where $X_0$ is the coil spacing at zero load, and the other terms have been defined previously.

For wire in general, Equation 30 would be:

$$X_0 \leq BS_{max.\text{ allowable}} + W \quad \text{Equation 30a}$$

where B is a factor converting stress to deflection and W is the distance from the centerline of adjacent coils of the spring.

Therefore, $X_0$ must satisfy both Equation 29 and Equation 30 whichever more greatly limits the size of $X_0$.

The present invention, therefore, will provide a power spring and method of operation which will deliver high energy output without failing. To date, one spring designed according to the present invention has been operated over 10 million cycles without breaking, whereas other springs not so designed have failed after short periods of operation. Several other springs were also designed to withstand inertia and harmonic surge, and were tested for 2–4 million cycles. No failures were observed.

The springs tested had very low ratios of natural to operating frequencies, usually as low as 3 to 5. Conventional methods recommend that this ratio be no lower than around 15 to 17 and under no circumstances should it fall below 8 or 10. This is probably correct if the coils are not spaced such that the coils can clash since we experienced several failures at less than 50,000 cycles before discovering the means of preventing harmonic surge.

The method of operation of the power spring of the present invention is apparent from the foregoing description. However, the method comprehends the prevention of harmonic oscillation in a power spring by compressing the coils until at least one oscillating coil touches an adjacent coil thereby dampening out the harmonic oscillation.

The present invention, therefore, is well adapted to carry out the objects and attain the ends and advantages mentioned as well as others inherent therein. While presently preferred embodiments of the invention are given for the purpose of disclosure, numerous changes in the details of construction, arrangement of parts, and steps of the process may be made which will readily suggest themselves to those skilled in the art and which are encompassed within the spirit of the invention and the scope of the appended claims.

What is claimed is:

1. A coil power spring which is alternately compressed and released to provide power, the improvement wherein the spring parameters are sized to overcome harmonic stresses by sizing $X_0$, the coil spacing at zero load, in accordance with the smaller of the following formulas:

$$X_0 \leq B \, S_{max\text{ allowable}} + W$$

and $$X_0 \leq \frac{Z_1 K}{K_c} + \frac{P_{R\text{ allowable}} - P_R}{NK_c} + W$$

where $Z_1$ is the distance the spring is compressed on the compression stroke

K is the spring rate of the active coils of the spring $P_{R\text{ allowable}}$ is the allowable force range of the spring material $P_R$ is the force range on the spring due to inertia surge N is the number of active coils in the spring $S_{max\text{ allowable}}$ is the allowable stress range of the spring material $K_c$ is the spring rate of a single coil of the spring W is the distance from the centerline of adjacent coils of the spring B is a factor converting stress to deflection.

2. A coil power spring which is alternately compressed and released to provide power, the improvement in the power spring to prevent harmonic oscillation of the spring wherein the spring is compressed on the compression stroke such that $$X_1 \leq \frac{P_{R\text{ allowable}} - P_R}{N^2 K} + W$$

where $X_1$ is the distance between the axis of adjacent spring coils when the spring is at maximum compression $P_{R\text{ allowable}}$ is the allowable force range of the spring material $P_R$ is the force range on the spring due to inertia surge $K_c$ is the spring rate of a single coil of the spring W is the distance from the centerline of adjacent coils of the spring N is the number of active coils in the spring.

3. A coil power spring which is alternately compressed and released to provide power, the improvement wherein the spring parameters are sized to overcome harmonic stresses by sizing $X_0$, the coil spacing at zero load, in accordance with the smaller of the following formulas:

$$X_0 \leq \frac{S_{\text{max. allowable}} \pi d^3}{8 K_c DC} + d$$

and $$X_0 \leq \frac{Z_1 K}{K_c} + \frac{P_{R\text{ allowable}} - P_R}{N K_c} + d$$

where $S_{\text{max allowable}}$ is the allowable stress range of the spring material $d$ is the wire diameter of the spring $K_c$ is the spring rate of a single coil of the spring $D$ is the spring coil diameter $C$ is a factor connecting for the curvature of the spring $Z_1$ is the distance the spring is compressed on the compression stroke $K$ is the spring rate of the active coils of the spring $P_{R\text{ allowable}}$ is the allowable force range of the spring material $P_R$ is the force range applied to the spring $N$ is the number of active coils in the spring.

4. In a coil power spring which is alternately compressed and released to provide a power output, the improvement to prevent harmonic oscillation of the spring wherein the spring is compressed on the compression stroke such that $$X_1 \leq \frac{P_{R\text{ allowable}} - P_R}{N^2 K} + d$$

where $X_1$ is the distance between the axis of adjacent spring coils when the spring is at maximum compression $P_{R\text{ allowable}}$ is the allowable force range of the spring material $P_R$ is the force range on the spring due to inertia surge $K_c$ is the spring rate of a single coil of the spring $N$ is the number of active coils in the spring $d$ is the wire diameter of the spring.

5. In an impact mechanism having a housing, a coil power spring in said housing and having one end adjacent thereto, a striker adjacent the second end of the spring, and means for alternately compressing and releasing said power spring to provide a power impact, the improvement wherein the spring parameters are sized to overcome harmonic stresses by sizing $X_0$, the coil spacing at zero load in accordance with the smaller of the following formulas:

$$X_0 \leq B S_{\text{max allowable}} + W$$

and $$X_0 \leq \frac{Z_1 K}{K_c} + \frac{P_{R\text{ allowable}} - P_R}{N K_c} + W$$

where $Z_1$ is the distance the spring is compressed on the compression stroke $K$ is the spring rate of the active coils of the spring $P_{R\text{ allowable}}$ is the allowable force range of the spring material $P_R$ is the force range on the spring due to inertia surge $N$ is the number of active coils in the spring $S_{\text{max allowable}}$ is the allowable stress range of the spring material $K_c$ is the spring rate of a single coil of the spring $W$ is the distance from the centerline of adjacent coils of the spring $B$ is a factor converting stress to deflection.

6. In an impact mechanism having a housing, a coil power spring in said housing and having one end adjacent thereto, a striker adjacent the second end of the spring, and means for alternately compressing and releasing said power spring to provide a power impact, the improvement to prevent harmonic oscillation of the spring wherein the spring is compressed on the compression stroke such that $$X_1 \leq \frac{P_{R\text{ allowable}} - P_R}{N^2 K} + W$$

where $X_1$ is the distance between the axis of adjacent spring coils when the spring is at maximum compression $P_{R\text{ allowable}}$ is the allowable force range of the spring material $P_R$ is the force range on the spring due to inertia surge $K_c$ is the spring rate of a single coil of the spring $W$ is the distance from the centerline of adjacent coils of the spring $N$ is the number of active coils in the spring.

7. In an impact mechanism having a housing, a coil power spring in said housing and having one end adjacent thereto, a striker adjacent the second end of the spring, and means for alternately compressing and releasing said power spring to provide a power impact, the improvement wherein the spring parameters are sized to overcome harmonic stresses by sizing $X_0$, the coil spacing at zero load, in accordance with the smaller of the following formulas:

$$X_0 \leq \frac{T_{\text{max. allowable}} \pi d^3}{8 K_c DC} + d$$

and $$X_0 \leq \frac{Z_1 K}{K_c} + \frac{P_{R\text{ allowable}} - P_R}{N K_c} + d$$

where $S_{\text{max allowable}}$ is the allowable stress range of the spring material $d$ is the wire diameter of the spring $K_c$ is the spring rate of a single coil of the spring $D$ is the spring coil diameter $C$ is a factor correcting for the curvature of the spring $Z_1$ is the distance the spring is compressed on the compression stroke $K$ is the spring rate of the active coils of the spring $P_{R\text{ allowable}}$ is the allowable force range of the spring material $P_R$ is the force range applied to the spring $N$ is the number of active coils in the spring.

8. In an impact mechanism having a housing, a coil power spring in said housing and having one end adjacent thereto, a striker adjacent the second end of the spring, and means for alternately compressing and releasing said power spring to provide a power impact, the improvement to prevent harmonic oscillation of the spring wherein the spring is compressed on the compression stroke such that $$X_1 \leq \frac{P_{R\text{ allowable}} - P_R}{N^2 K} + d$$

where $X_1$ is the distance between the axis of adjacent spring coils when the spring is at maximum compression $P_{R\text{ allowable}}$ is the allowable force range of the spring material $P_R$ is the force range on the spring due to inertia surge $K_c$ is the spring rate of a single coil of the spring $N$ is the number of active coils in the spring $d$ is the wire diameter of the spring.

9. In an impact mechanism having a coil power spring which is alternately compressed and released to provide a power impact of at least 25 foot pounds, the improvement wherein the spring parameters are sized to overcome the dynamic load in accordance with the formula:

$$S_{R\ allowable} \leq (X_3 - X_1)V$$

where
- $S_{R\ allowable}$ is the allowable stress range of the spring material
- V is a factor converting deflection to stress
- $X_1$ is the distance between the axis of adjacent spring coils when the spring is at maximum compression
- $X_3$ is the maximum distance the top active coil opens during the impact cycle.

10. In an impact mechanism having a coil power spring of round wire which is alternately compressed and released to provide a power impact of at least 25 foot pounds, the improvement wherein the spring parameters are sized to overcome the dynamic load in accordance with the formula:

$$S_{R\ allowable} \geq \frac{(X_3 - X_1)GdC}{\pi D^2}$$

where
- $S_{R\ allowable}$ is the allowable stress range of the spring material
- D is the spring coil diameter
- $d$ is the wire diameter of the spring
- G is the torsional modulus of rigidity of the material
- C is a factor correcting for the curvature of the spring
- $X_1$ is the distance between the axis of adjacent spring coils when the spring is at maximum compression
- $X_3$ is the maximum distance the top active coil opens during the impact cycle.

11. In an impact mechanism having a coil power spring which is alternately compressed and released to provide a power impact, the improvement wherein the spring parameters are sized relative to $S_{R\ allowable}$, at all intervals of time, to provide at least 25 foot pounds output and overcome the dynamic load in accordance with the formula:

$$S_{R\ allowable} \geq F\{P_{max} - K_{(m)}[Y_{(m,t)} - Y_{(m+1,t)}]\}$$

where
- $S_{R\ allowable}$ is the allowable stress range of the spring material
- $P_{max}$ is the maximum load to be applied to the spring
- $K_{(m)}$ is the spring rate of weightless spring $m$
- $Y_{(m,t)}$ is the displacement of coil segment $m$ at time $t$
- $Y_{(m+1,t)}$ is displacement of coil segment $m$ at time $t$
- F is factor converting force to stress in the spring.

12. In an impact mechanism having a coil power spring which is alternately compressed and released to provide a power spring, the improvement wherein the spring parameters are sized relative to $S_{R\ allowable}$, at all intervals of time, to provide at least 25 foot pounds output and to overcome the dynamic load in accordance with the formula:

$$S_{R\ allowable} \geq \frac{8DC}{\pi d^3}\{P_{max} - K_{(m)}[Y_{(m,\ t)} - Y_{(m+1,\ t)}]\}$$

where
- $S_{R\ allowable}$ is the allowable stress range of the spring material
- D is the spring coil diameter
- C is a factor correcting for the curvature of the spring
- $d$ is the wire diameter of the spring
- $P_{max}$ is the maximum load to be applied to the spring
- $K_{(m)}$ is the spring rate of weightless spring $m$
- $Y_{(m,t)}$ is displacement of coil segment $m$ at time $t$
- $Y_{(m+1,t)}$ is displacement of coil segment $m+1$ at time $t$, 13. In an impact mechanism having a coil power spring, a striker positioned adjacent one end of the spring, and means alternately compressing and releasing said power spring to provide a power output of at least 25 foot pounds, the improvement in the power spring wherein the spring parameters are sized in accordance with the graphs of FIGURES 22 through 29 of $UK/Ws^2$ vs. $P_R/Ws$ to avoid overstressing the spring, wherein a base of $P_{max}/Ws = 1000$ is used and other values of $P_{max}/Ws$ are provided in accordance with the following formulas:

$$\frac{(P_R/Ws)_{Prob.}}{(P_R/Ws)_{Base}} = \frac{(P_{max.}/Ws)_{Prob.}}{1000}$$

$$\frac{(UK/Ws^2)_{Prob.}}{(UK/Ws^2)_{Base}} = \frac{(P_{max.}/Ws)^2}{1000^2}$$

and in which
- UK is the energy output required
- K is the spring rate of the active coils of the spring
- Ws is the weight of the striker
- $P_R$ is the force range applied to the spring
- $P_{max}$ is the maximum static force applied to the spring
- R is the percent of preloaded closed coils to the active coils of the spring
- Wac is the total weight of the active coils of the spring.

Figure 30:
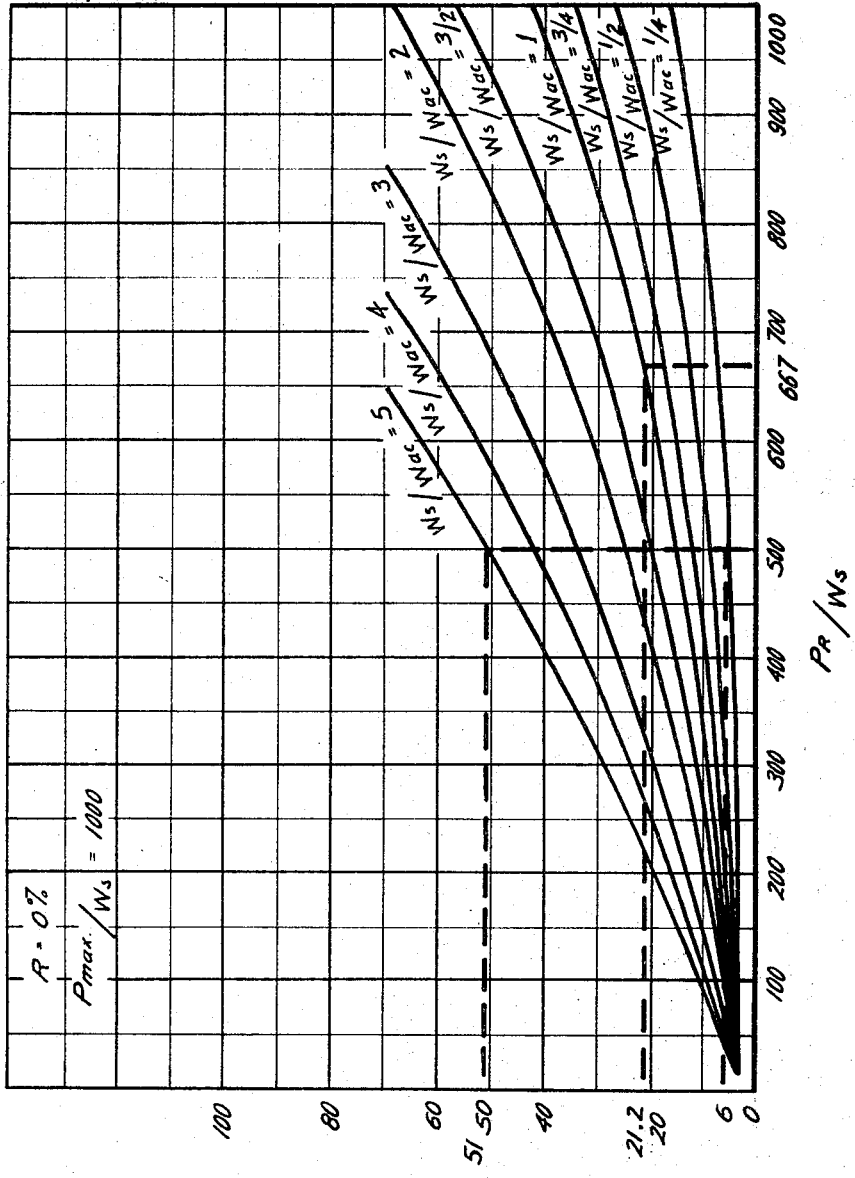
Figure 31:
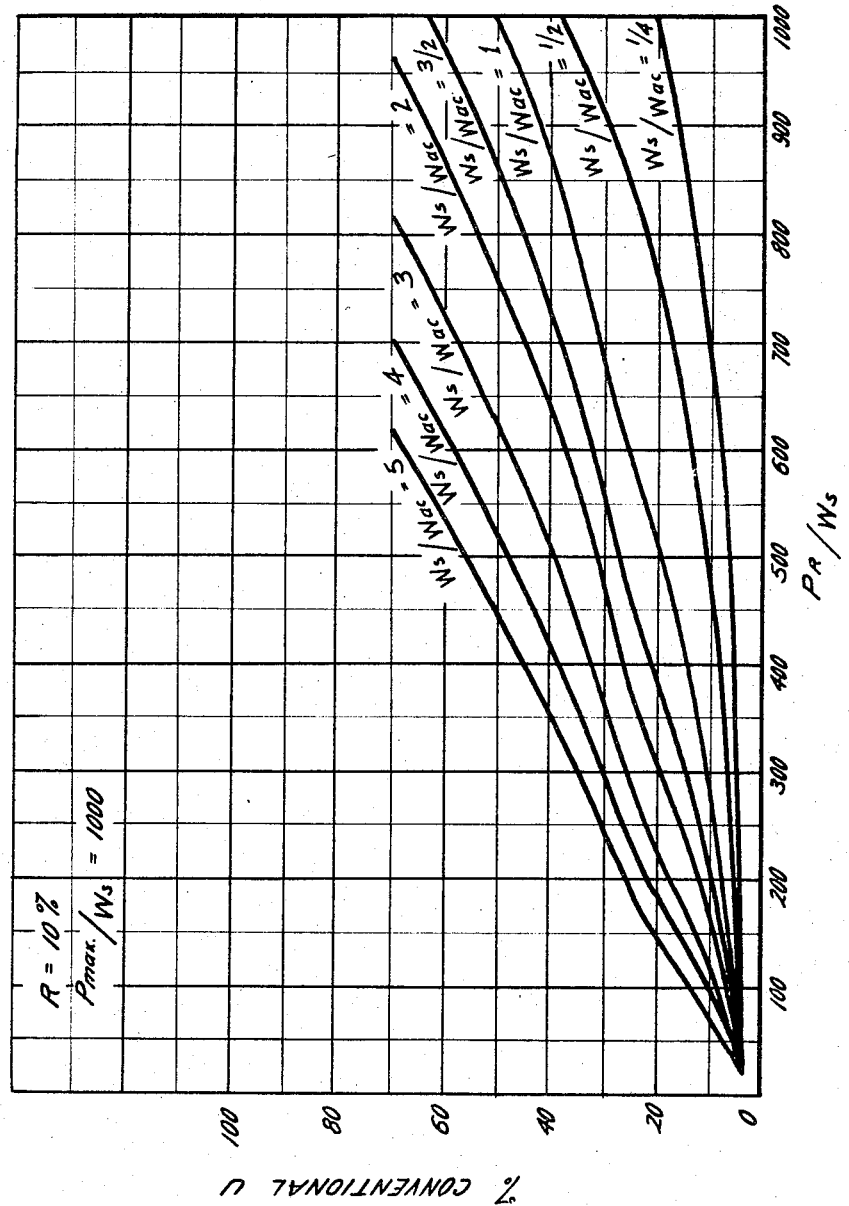
Figure 32:
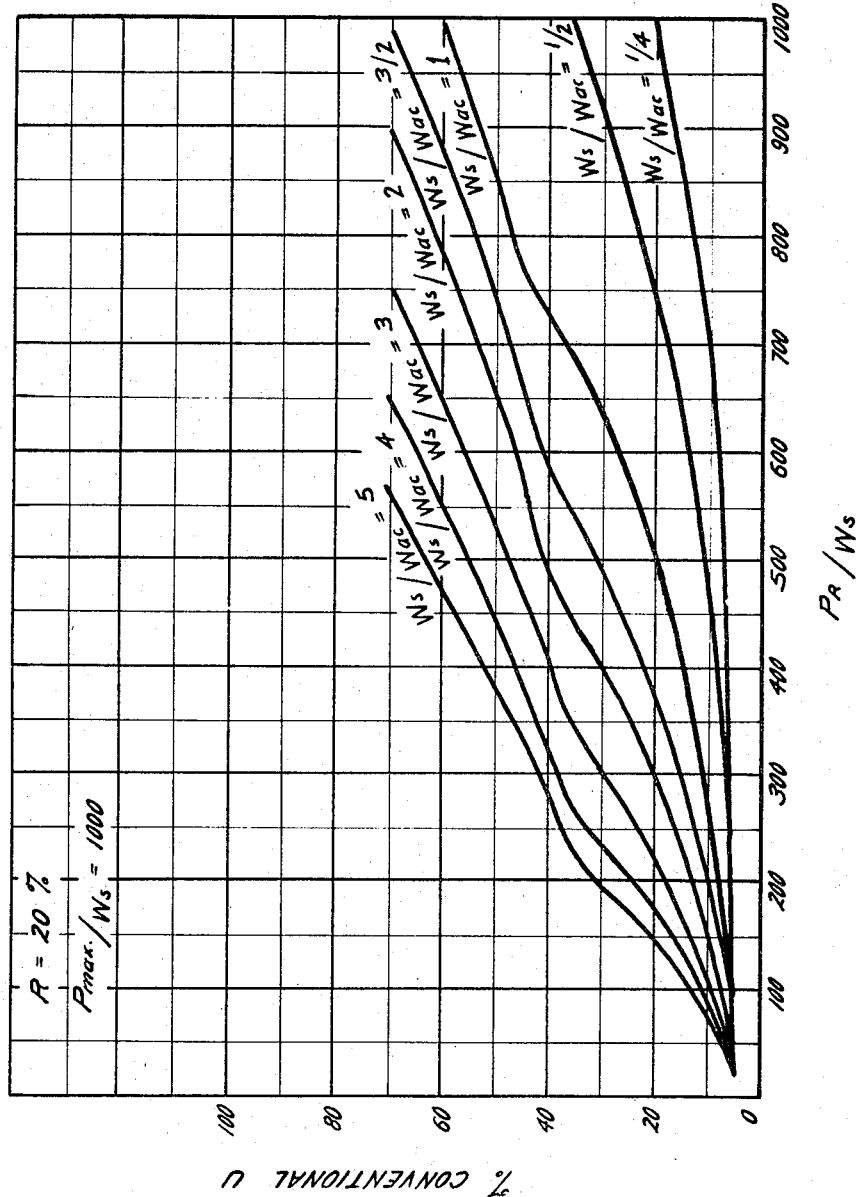
Figure 33:
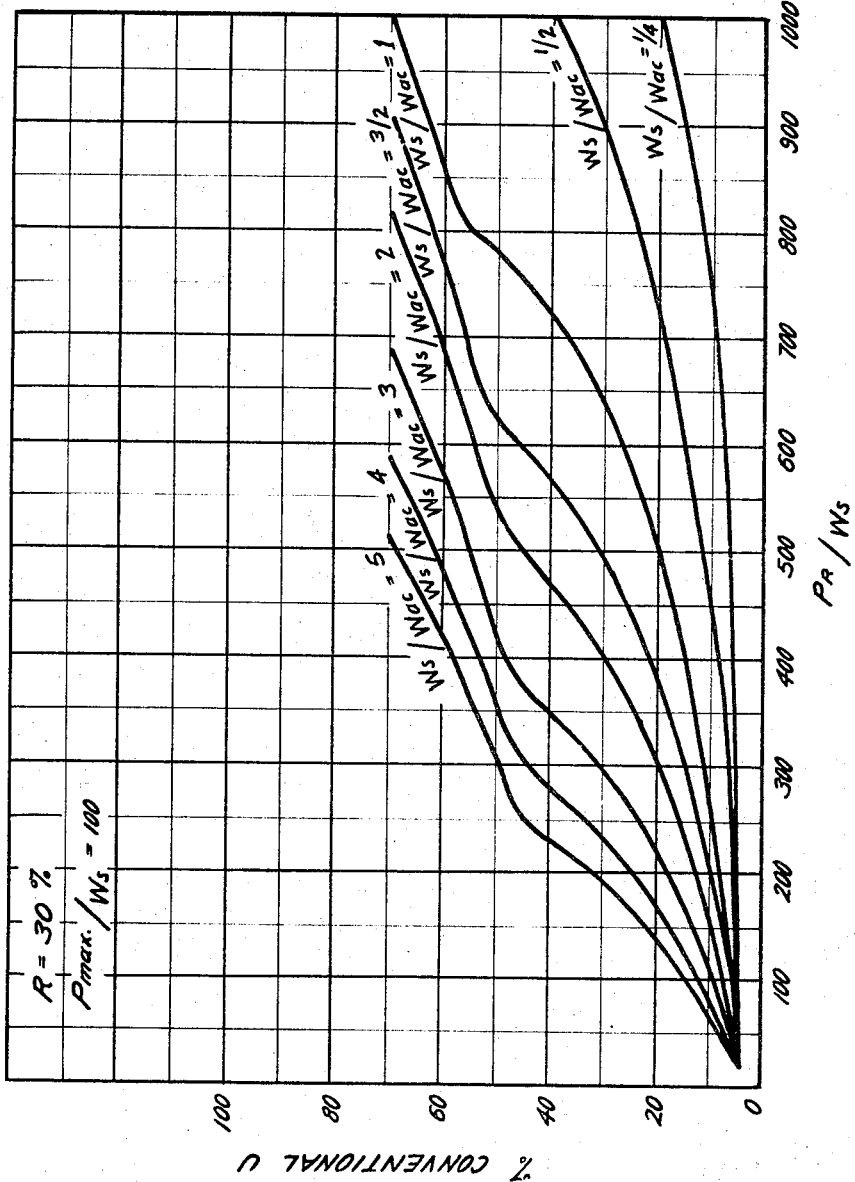
Figure 34:
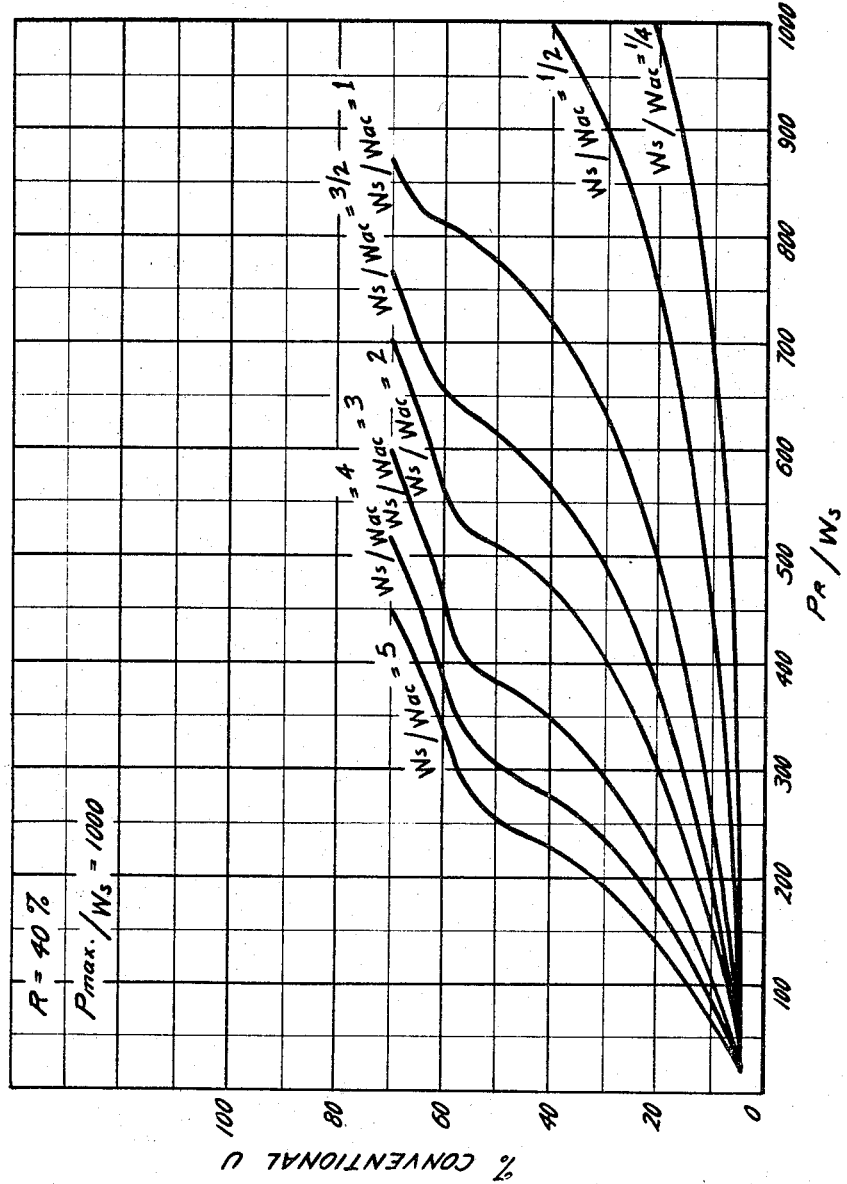
Figure 35:
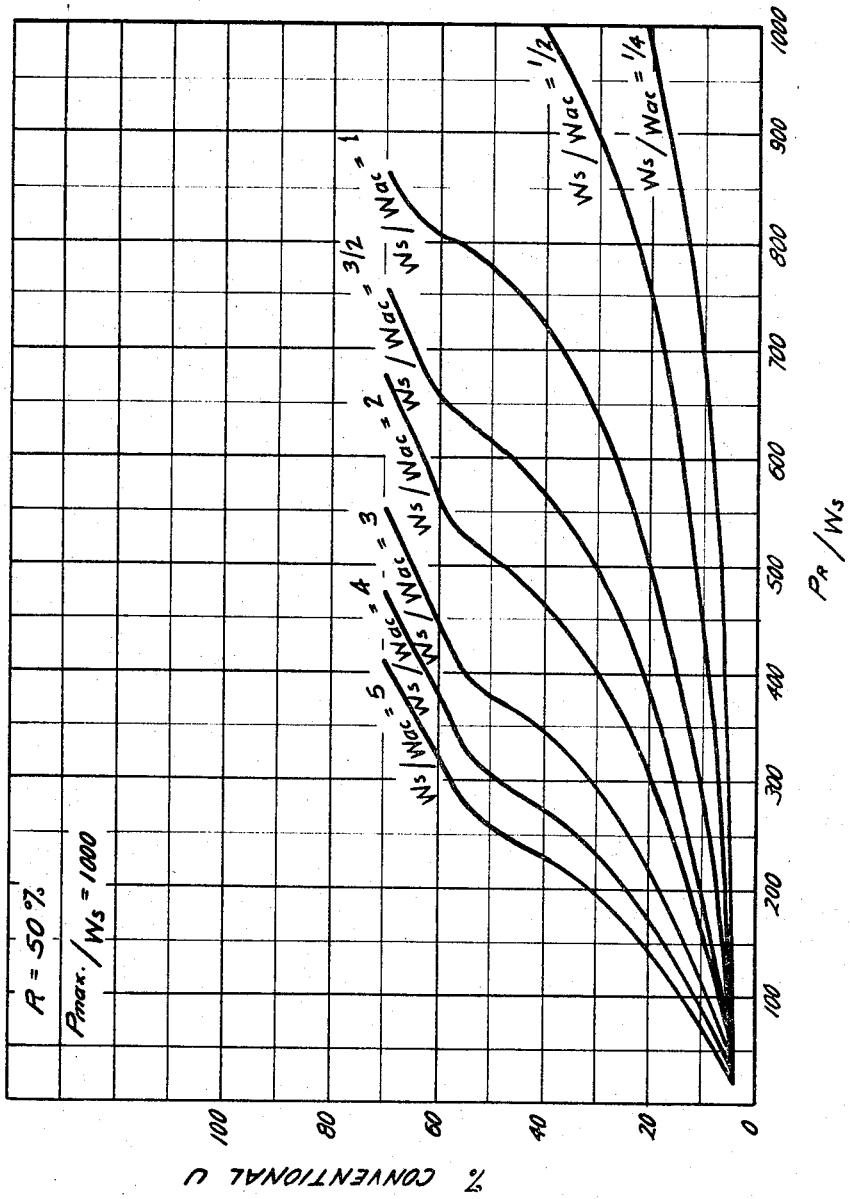
Figure 36:
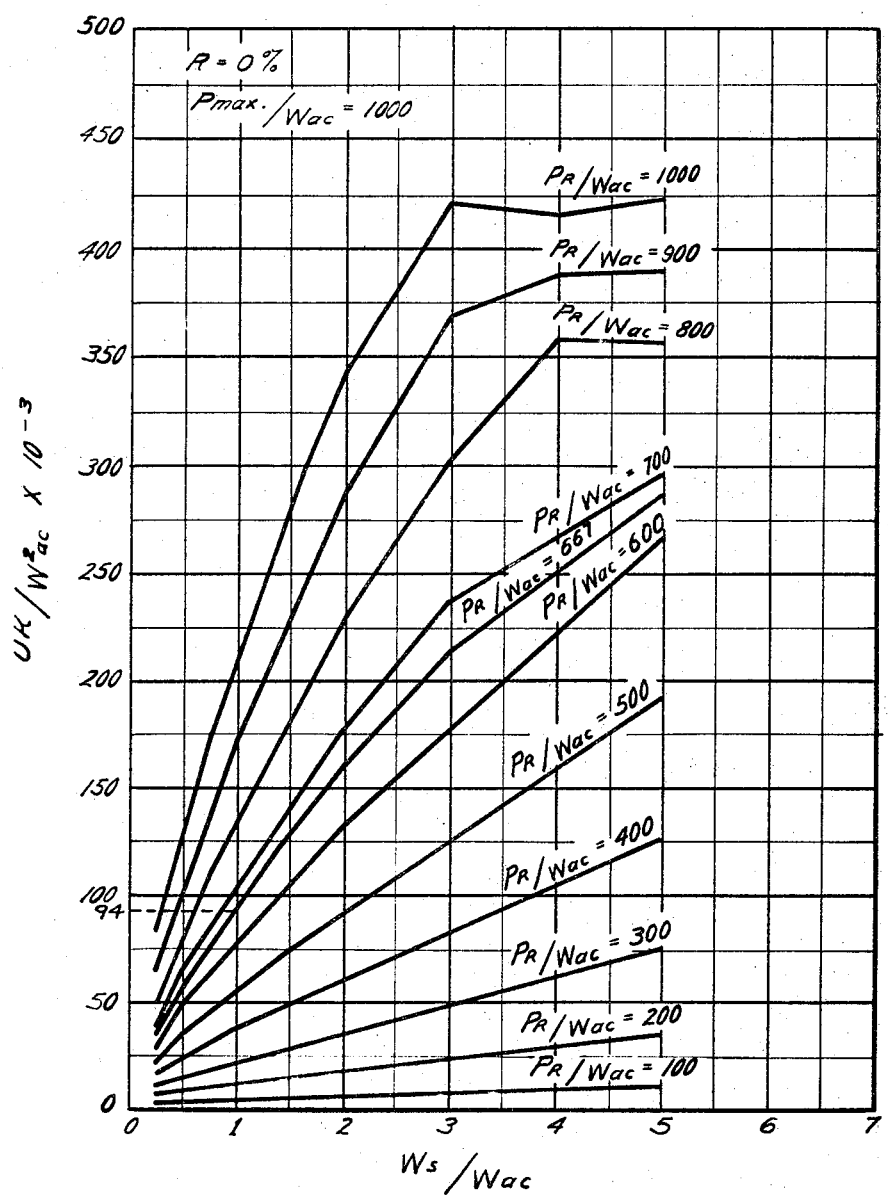

14. In an impact mechanism having a coil power spring, a striker adjacent one end of the spring, and means for alternately compressing and releasing the spring to provide a power output of at least 25 foot pounds the improvement in the power spring wherein the spring parameters are sized in accordance with the graphs of FIGURES 30 through 36 of percent of conventional allowable energy output vs. $P_R/Wc$ for which a base of $P_{max}/Ws$ equal to 1000 is used and other values of $P_{max}/Ws$ are provided in accordance with the following formulas:

$$\frac{(P_R/Ws)_{Prob.}}{(P_R/Ws)_{Base}} = \frac{(P_{max.}/Ws)_{Prob.}}{1000}$$

$$\frac{(UK/Ws^2)_{Prob.}}{(UK/Ws^2)_{Base}} = \frac{(P_{max.}/Ws)^2}{1000^2}$$

and in which
- R is the percent of preloaded closed coils to the active coils of the spring
- Wac is the total weight of the active coils of the spring
- $P_R$ is the force range applied to the spring
- Ws is the weight of the striker
- $P_{max}$ is the maximum static force applied to the spring
- U is the energy output required
- K is the spring rate of the active coils of the spring.

Figure 37:
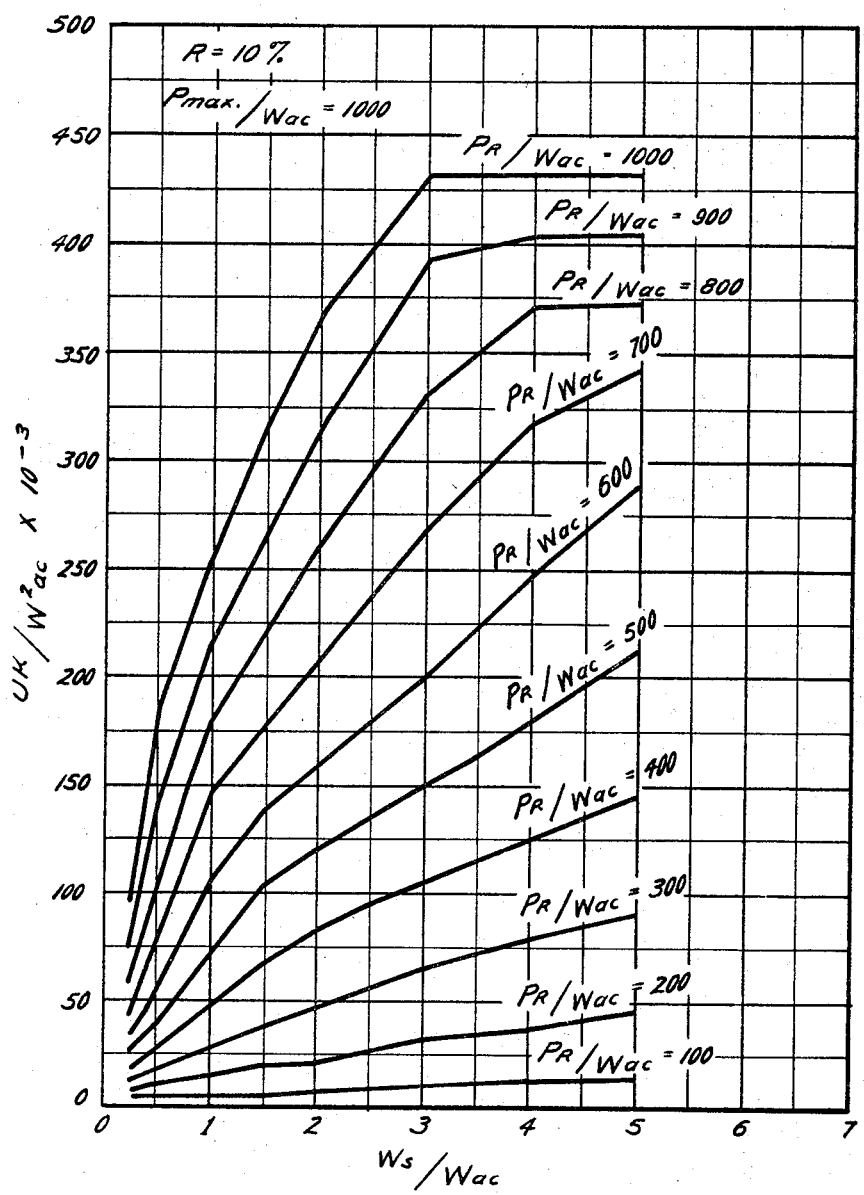
Figure 38:
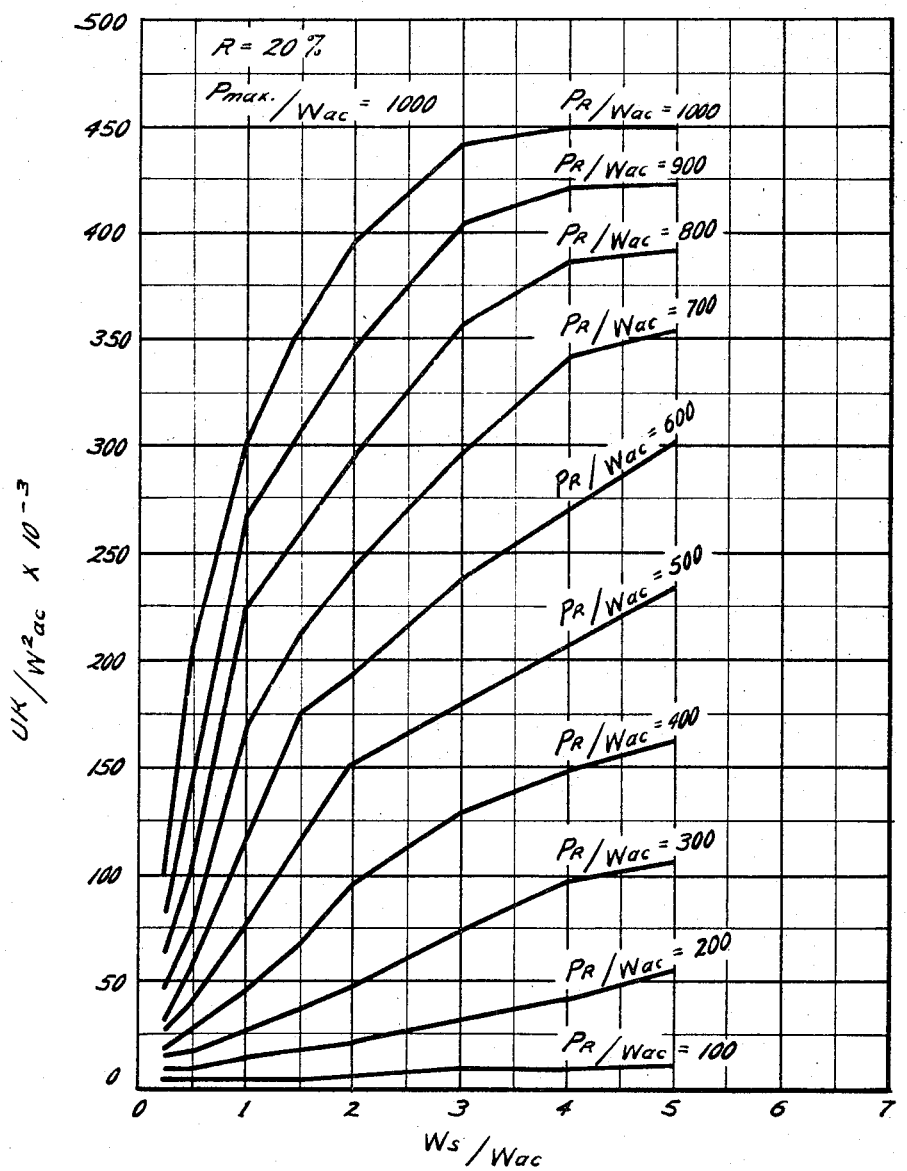
Figure 39:
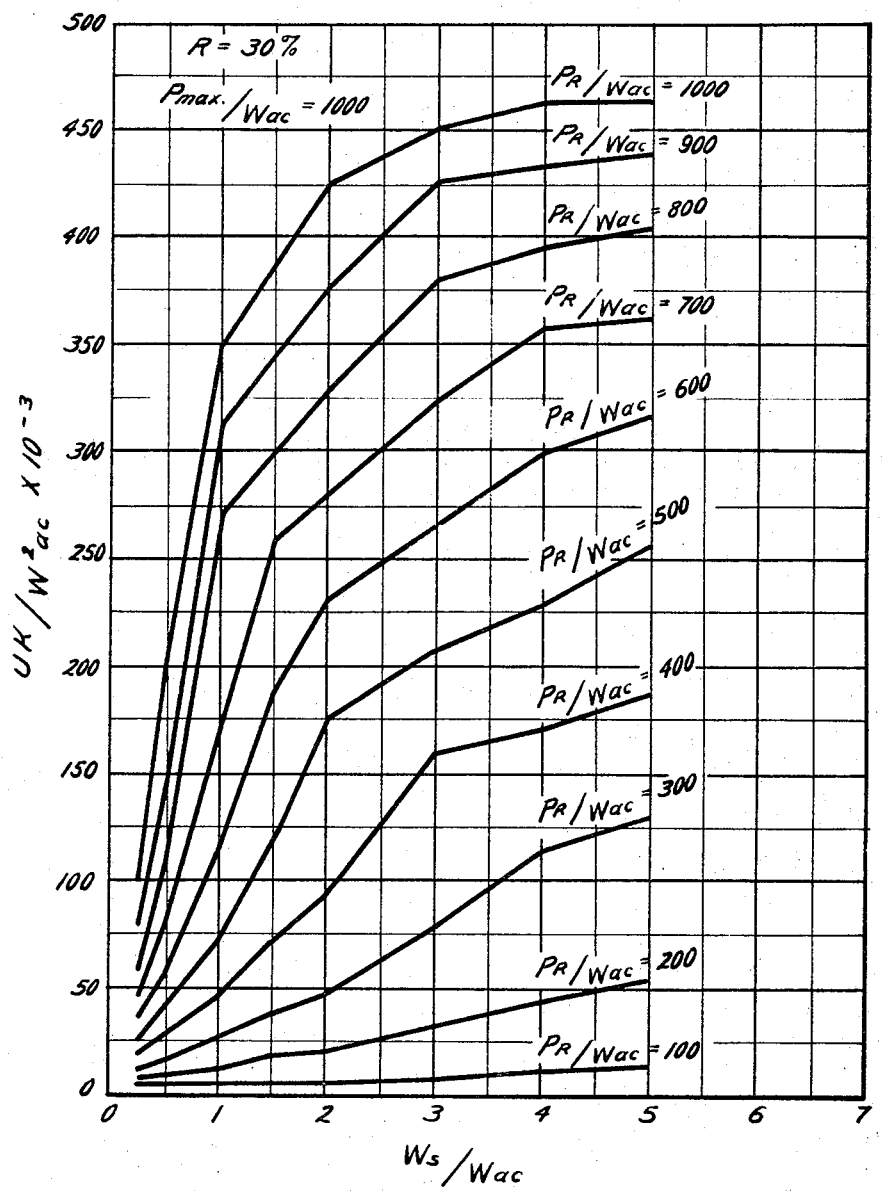
Figure 40:
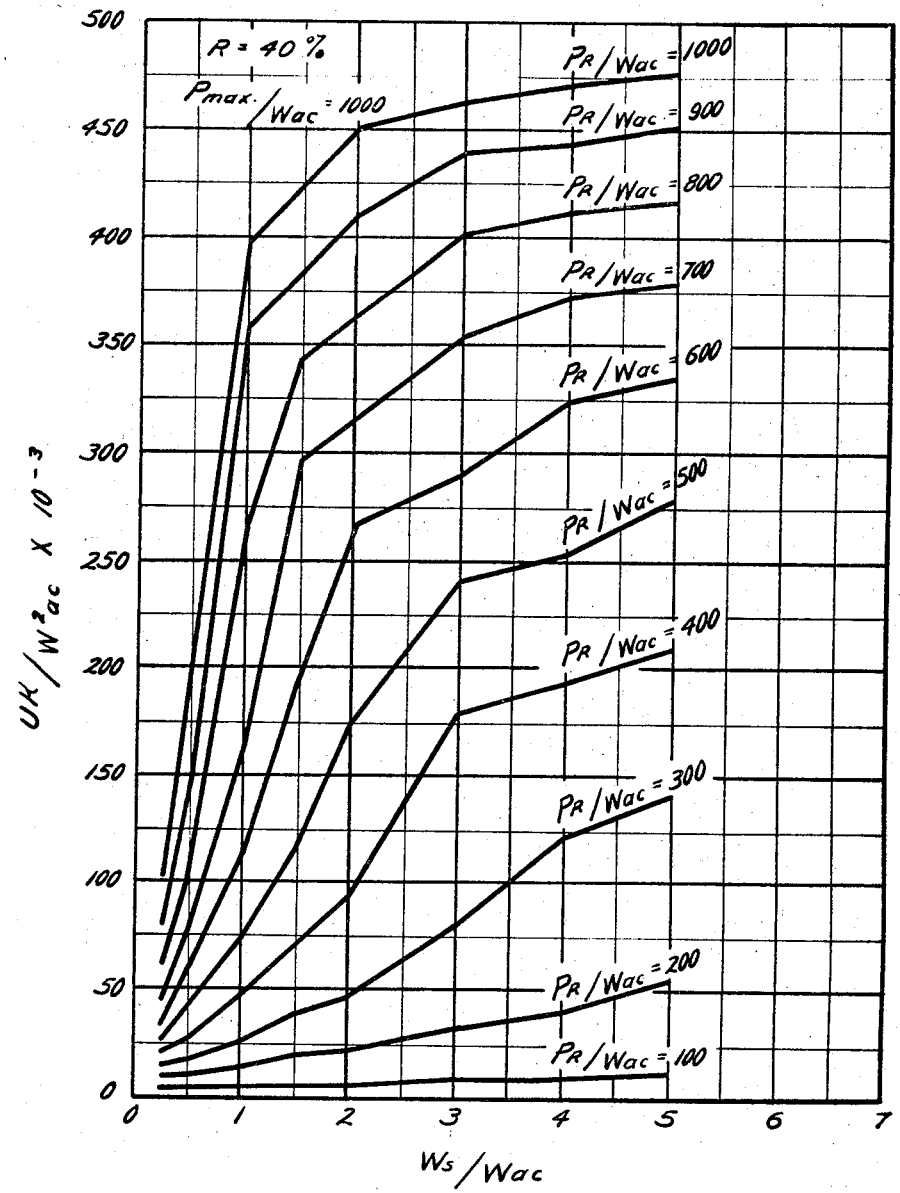
Figure 41:
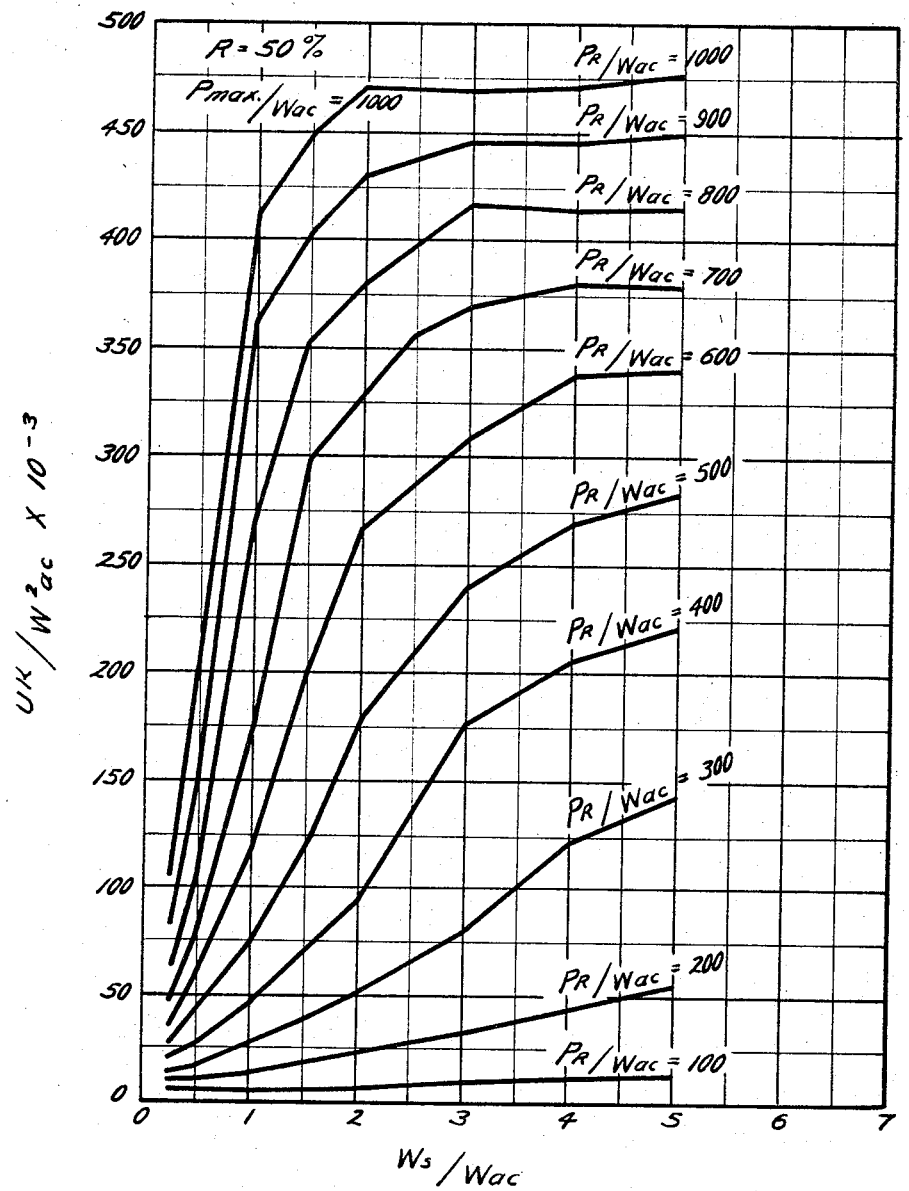

15. In an impact mechanism having a coil power spring, a striker adjacent one end of the spring, and means alternately compressed and releasing the spring to provide a power output at least 25 foot pounds, the improvement in the power spring wherein the spring parameters are sized in accordance with the graphs of FIGURES 36 through 41 of $UK/Wac^2$ vs. $Ws/Wac$ for which a base of $P_{max}/Wac$ equal to 1000 is used and other values of $P_{max}/Wac$ are provided in accordance with the following formulas:

$$\frac{(P_R/Wac)_{Prob.}}{(P_R/Wac)_{Base}} = \frac{(P_{max.}/Wac)_{Prob.}}{1000}$$

$$\frac{(UK/Wac^2)_{Prob.}}{(UK/Wac^2)_{Base}} = \frac{(P_{max.}/Wac)^2_{Prob.}}{1000^2}$$

and in which
- R is the percent of preloaded closed coils to the active coils of the spring
- Wac is the total weight of the active coils of the spring
- $P_R$ is the force range applied to the spring
- $P_{max}$ is the maximum static force applied to the spring
- U is the energy output
- K is the spring rate of the active coils of the spring
- Ws is the weight of the striker.

16. In an impact mechanism having a coil power spring which is alternately compressed and released to provide a power impact of at least 25 foot pounds, the improvement wherein the spring parameters are sized in accordance with the formula:

$$S_{R\text{ allowable}} \geq (X_3 - X_1)V$$

where
- $S_{R\text{ allowable}}$ is the allowable stress range of the spring material
- V is a factor converting deflection to stress
- $X_1$ is the distance between the axis of adjacent spring coils when the spring is at maximum compression,
- $X_3$ is the maximum distance the top active coil opens during the impact cycle, and the coil spacing at zero load, $X_0$ is sized in accordance with the smaller of the following formulas:

$$X_0 \leq BS_{\text{max allowable}} + W$$

and $$X_0 \leq \frac{Z_1 K}{K_c} = \frac{P_{R\text{ allowable}} - P_R}{NK_c} + W$$

where
- $Z_1$ is the distance the spring is compressed on the compression stroke
- K is the spring rate of the active coils of the spring
- $P_{R\text{ allowable}}$ is the allowable force range of the spring material
- $P_R$ is the force range on the spring due to inertia surge
- N is the number of active coils in the spring
- $S_{\text{max allowable}}$ is the allowable stress range of the spring material
- $K_c$ is the spring rate of a single coil of the spring
- W is the distance from the centerline of adjacent coils of the spring
- B is a factor converting stress to deflection.

17. In an impact mechanism having a coil power spring which is alternately compressed and released to provide a power impact of at least 25 foot pounds, the improvement wherein the spring parameters are sized to overcome the dynamic load in accordance with the formula:

$$S_{R\text{ allowable}} \geq \frac{(X_3 - X_1)GdC}{\pi D^2}$$

where
- $S_{R\text{ allowable}}$ is the allowable stress range of the spring material
- D is the spring coil diameter
- d is the wire diameter of the spring
- G is the torsional modulus of rigidity of the material
- C is a factor correcting for the curvature of the spring
- $X_1$ is the distance between the axis of adjacent spring coils when the spring is at maximum compression
- $X_3$ is the maximum distance the top active coil opens during the impact cycle, and the coil spacing, $X_0$, is sized to overcome harmonic stresses by being sized in accordance with the smaller of the following formulas:

$$X_0 \leq \frac{S_{\text{max. allowable}} \pi d^3}{8K_c DC} + d$$

and $$X_0 \leq \frac{Z_1 K}{K_c} + \frac{P_{R\text{ allowable}} - P_R}{NK_c} + d$$

where
- $S_{\text{max allowable}}$ is the allowable stress range of the spring material
- d is the wire diameter of the spring
- $K_c$ is the spring rate of a single coil of the spring
- D is the spring coil diameter
- C is a factor correcting for the curvature of the spring
- $Z_1$ is the distance the spring is compressed on the compression stroke
- K is the spring rate of the active coils of the spring
- $P_{R\text{ allowable}}$ is the allowable force range of the spring material
- $P_R$ is the force range applied to the spring
- N is the number of active coils in the spring.

18. An impact mechanism comprising,
a housing,
a coil power spring in said housing and having one end adjacent said housing, the ratio of the natural resonant frequency of the spring to the frequency of operation of the impact mechanism being insufficient to prevent harmonic oscillation of the spring coils,
a striker in said housing and adjacent the second end of the spring,
means for alternately compressing and releasing said power spring to provide a power impact, said means compressing the spring until the oscillating coils contact an adjacent coil thereby dampening the harmonic surge, and
the spring parameters are sized relative to $S_{R\text{ allowable}}$, at all intervals of time, to provide at least 25 foot pounds output and to overcome the dynamic load in accordance with the formula:

$$S_{R\text{ allowable}} \geq F\{P_{\max} - K_{(m)}[Y_{(m,t)} - Y_{(m+1,t)}]\}$$

where
- $S_{R\text{ allowable}}$ is the allowable stress range of the spring material
- $P_{\max}$ is the maximum load to be applied to the spring
- $K_{(m)}$ is the spring rate of weightless spring $m$
- $Y_{(m,t)}$ is displacement of coil segment $m$ at time $t$
- $Y_{(m+1,t)}$ is displacement of coil segment $m+1$ at time $t$
- F is a factor converting force to stress in the spring.

19. In an impact mechanism having a coil power spring which is alternately compressed and released to provide a power impact of at least 25 foot pounds, the improvement wherein the spring parameters are sized in accordance with the formulas:

$$S_{R\text{ allowable}} \geq (X_3 - X_1)V$$

where
- $S_{R\text{ allowable}}$ is the allowable stress range of the spring material
- V is a factor converting deflection to stress
- $X_1$ is the distance between the axis of adjacent spring coils when the spring is at maximum compression,
- $X_3$ is the maximum distance the top active coil opens during the impact cycle, and $$X_1 \leq \frac{P_{R\text{ allowable}} - P_R}{N^2 K} + W$$

where
- $X_1$ is the distance between the axis of adjacent spring coils when the spring is at maximum compression
- $P_{R\text{ allowable}}$ is the allowable force range of the spring material
- $P_R$ is the force range on the spring due to inertia surge
- $K_c$ is the spring rate of a single coil of the spring
- W is the distance from the centerline of adjacent coils of the spring
- N is the number of active coils in the spring.

20. In an impact mechanism having a coil power spring which is alternately compressed and released to provide a power impact of at least 25 foot pounds, the improvement wherein the spring parameters are sized in accordance with the formulas:

$$S_{R\text{ allowable}} \geq \frac{(X_3 - X_1)GdC}{\pi D^2}$$

where
- $S_{R\text{ allowable}}$ is the allowable stress range of the spring material
- D is the spring coil diameter
- d is the wire diameter of the spring
- G is the torsional modulus of rigidity of the material
- C is a factor correcting for the curvature of the spring
- $X_1$ is the distance between the axis of adjacent spring coils when the spring is at maximum compression
- $X_3$ is the maximum distance the top active coil opens during the impact cycle, and $$X_1 \leq \frac{P_{R\text{ allowable}} - P_R}{N^2 K} + d$$

where
- $X_1$ is the distance between the axis of adjacent spring coils when the spring is at maximum compression
- $P_{R\ allowable}$ is the allowable force range of the spring material
- $P_R$ is the force range on the spring due to inertia surge
- $K_c$ is the spring rate of a single coil of the spring
- $N$ is the number of active coils in the spring
- $d$ is the wire diameter of the spring.

References Cited

UNITED STATES PATENTS

| | | | |
|---|---|---|---|
| 1,386,855 | 8/1921 | Ewing | 267—61 X |
| 2,387,264 | 10/1945 | Holland | 267—61 |
| 2,492,840 | 12/1949 | Bugg | 173—119 X |
| 2,643,109 | 6/1953 | Wood. | |
| 2,789,550 | 4/1957 | Black | 267—61 X |
| 2,861,778 | 11/1958 | Spurlin | 173—119 X |

FOREIGN PATENTS

| | | |
|---|---|---|
| 206,316 | 11/1923 | Great Britain. |
| 249,459 | 9/1926 | Great Britain. |

OTHER REFERENCES

Handbook of Mechanical Spring Design, Copyright 1956 by Associated Spring Corp., Bristol, Conn., 8th printing pp. 27 and 28.

DAVID H. BROWN, *Primary Examiner.*